US012752569B2

(12) United States Patent
Namiki et al.

(10) Patent No.: US 12,752,569 B2
(45) Date of Patent: Oct. 6, 2026

(54) WRITING INSTRUMENT

(71) Applicant: MITSUBISHI PENCIL COMPANY, LIMITED, Tokyo (JP)

(72) Inventors: Yoshiharu Namiki, Tokyo (JP); Makoto Tamura, Tokyo (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 99 days.

(21) Appl. No.: 18/873,867

(22) PCT Filed: Nov. 16, 2023

(86) PCT No.: PCT/JP2023/041227
§ 371 (c)(1),
(2) Date: Dec. 11, 2024

(87) PCT Pub. No.: WO2024/106498
PCT Pub. Date: May 23, 2024

(65) Prior Publication Data

US 2026/0077614 A1 Mar. 19, 2026

(30) Foreign Application Priority Data

Nov. 18, 2022 (JP) ................................ 2022-185170

(51) Int. Cl.
*B43K 15/00* (2006.01)
*B43K 24/08* (2006.01)

(52) U.S. Cl.
CPC ............ *B43K 24/084* (2013.01); *B43K 15/00* (2013.01); *B43K 24/08* (2013.01)

(58) Field of Classification Search
CPC ...... B43K 24/084; B43K 24/02; B43K 24/08; B43K 24/086; B43K 24/088; B43K 24/16; B43K 24/163; B43K 24/183; B43K 15/00

(Continued)

(56) References Cited

U.S. PATENT DOCUMENTS 8,511,925 B2 * 8/2013 Noguchi .................. B43K 7/03
401/187
10,787,022 B2 * 9/2020 Soejima ............... B43K 24/088

FOREIGN PATENT DOCUMENTS

JP 2011-212985 A 10/2011
JP 2013-52633 A 3/2013
(Continued)

OTHER PUBLICATIONS

International Search Report issued Jan. 16, 2024, in PCT Application No. PCT/JP2023/041227 filed Nov. 16, 2023, 2 pages.

*Primary Examiner* — David J Walczak

(74) *Attorney, Agent, or Firm* — Oblon, McClelland, Maier & Neustadt, L.L.P.

(57) ABSTRACT

A click-action writing instrument 1 comprises a rear shaft 20, an inner cylinder 30 having on a side surface thereof an elastic deformation portion 37 that can elastically deform radially outward and inward, and a rotor 40. The elastic deformation portion has a first protrusion 38 on the outer surface thereof. The elastic deformation portion has a second protrusion 39 on the inner surface thereof. The first protrusion 38 is configured to cause the elastic deformation portion to deform radially inward when the inner cylinder is inserted into the rear shaft. The second protrusion 39, in a state prior to insertion of the inner cylinder into the rear shaft, causes the elastic deformation portion to deform radially outward when the rotor is inserted into the inner cylinder. The deformed elastic deformation portion is configured to recover after the rotor is inserted.

7 Claims, 24 Drawing Sheets

(58) Field of Classification Search
USPC .................. 401/99, 109, 110, 111, 112, 117
See application file for complete search history.

(56) References Cited

FOREIGN PATENT DOCUMENTS

| | | | |
|---|---|---|---|
| JP | 2016-43499 | A | 4/2016 |
| JP | 2021-30669 | A | 3/2021 |

* cited by examiner

WRITING INSTRUMENT

FIELD

The present invention relates to a writing instrument.

BACKGROUND

Known in the art is a writing instrument configured so that, when disassembling the writing instrument at the time of replacement of a refill, a rotor will not detach from a shaft barrel or inside barrel (PTL 1). That is, in the writing instrument described in PTL 1, an inside barrel is formed with an elastically deformable part sticking out to the inside more than an outer diameter of the rotor when arranged in a shaft barrel at a position at a front side from the rotor in the assembled state.

CITATIONS LIST

Patent Literature

[PTL 1] Japanese Unexamined Patent Publication No. 2021-30669

SUMMARY

Technical Problem

In this regard, in recent years, design of parts enabling easier assembly and disassembly has been sought from the viewpoint of reutilization or effective utilization of materials, etc. A writing instrument is usually comprised two tubular members fit together like in the relationship of the inside barrel and the rotor described in PTL 1. The ease of assembly and the ease of disassembly are important.

Specifically, when assembling the writing instrument described in PTL 1, the rotor is inserted inside an inside barrel in a state with an elastically deformable part of the inside barrel attached to the rear shaft being deformed and sticking out to the inside. The rotor is arranged at a predetermined position, so the rotor has to ride over the elastically deformable part against the frictional resistance with the elastically deformable part sticking out to the inside. If making the amount of projection to the inside smaller to reduce the frictional resistance due to the elastically deformable part, at the time of replacement of the refill, the rotor is liable to unintentionally drop off from the inside barrel. On the other hand, if inserting the rotor into the inside barrel before attaching the inside barrel to the rear shaft, since the elastically deformable part does not deform to the inside, the rotor is liable to drop off due to its weight from the inside barrel when attaching it to the inside barrel and rear shaft. Furthermore, the inside barrel is attached to the rear shaft by engagement so in the case of a user with a strong writing pressure, force is liable to be transmitted through the refill and the rotor to the inside barrel and the inside barrel is liable to be detached from the rear shaft.

The present invention has as its object the provision of a writing instrument which is easier to assemble and disassemble.

Solution to Problem

According to one aspect of the present invention, there is provided a writing instrument comprising a cylindrical first tubular member, a cylindrical second tubular member inserted inside the first tubular member from one end part of the first tubular member, the second tubular member provided at its side surface with an elastically deformable part able to elastically deform to the outside and to the inside in the radial direction, and a cylindrical or columnar inside member inserted inside the second tubular member from one end part of the second tubular member, an outside surface of the elastically deformable part or an inside surface of the first tubular member having a first fitting part, an inside surface of the elastically deformable part having a second fitting part, the first fitting part configured to make the elastically deformable part deform to the inside in the radial direction if the second tubular member is inserted into the first tubular member, the second fitting part configured to make the elastically deformable part deform to the outside in the radial direction if the inside member is inserted inside the second tubular member in a state before the second tubular member is inserted inside the first tubular member, the deformed elastically deformable part returning after insertion of the inside member.

The first tubular member may be a shaft barrel, the second tubular member may be an inside barrel inserted from a rear end part of the shaft barrel, and the inside member may be a rotor or operating member inserted from a front end part of the inside barrel. A writing instrument may be further provided, the first tubular member may be a rear shaft, the second tubular member being an inside barrel inserted from a rear end part of the rear shaft, the front shaft and the inside barrel may be screwed together, and the inside member may be a rotor or operating member inserted from a front end part of the inside barrel. The elastically deformable part may be a cantilever shape extending to the rear. The first fitting part or the second fitting part may be a projection.

Advantageous Effects of Invention

According to an aspect of the present invention, the common effect is exhibited of provision of a writing instrument which is easier to assemble and disassemble.

DESCRIPTION OF EMBODIMENTS

Figure 1:
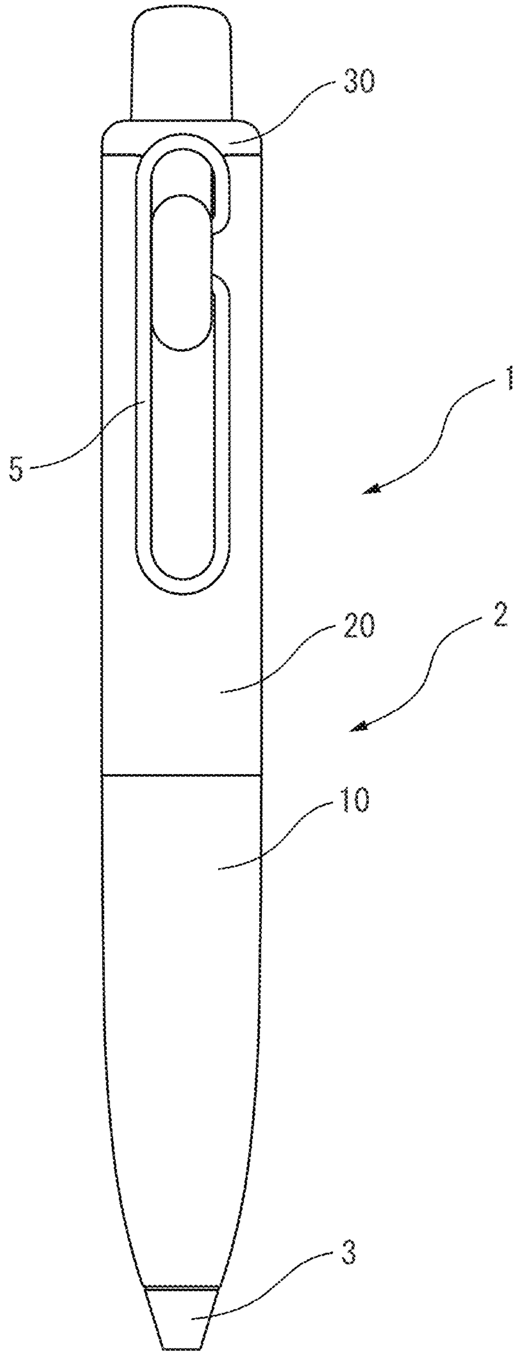
FIG. 1 is a side view of a first knock type writing instrument in a nonwriting state.

Below, while referring to the drawings, embodiments of the present invention will be explained in detail. Throughout the figures, corresponding component elements will be assigned common reference notations.

Figure 2:
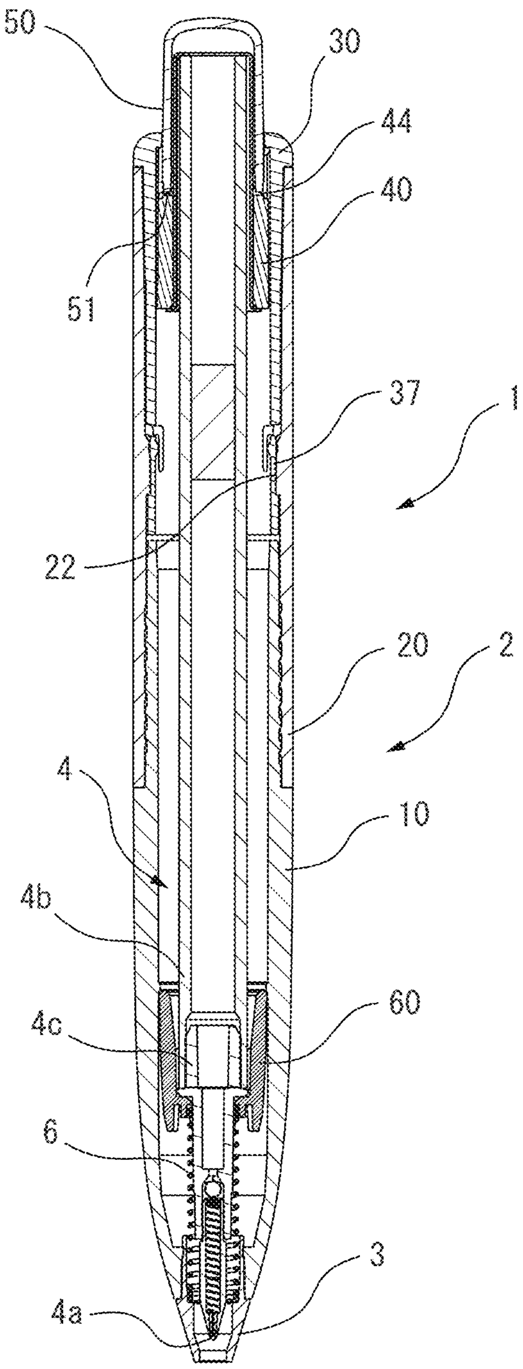
FIG. 2 is a vertical cross-sectional view of the knock type writing instrument of FIG. 1.
Figure 3:
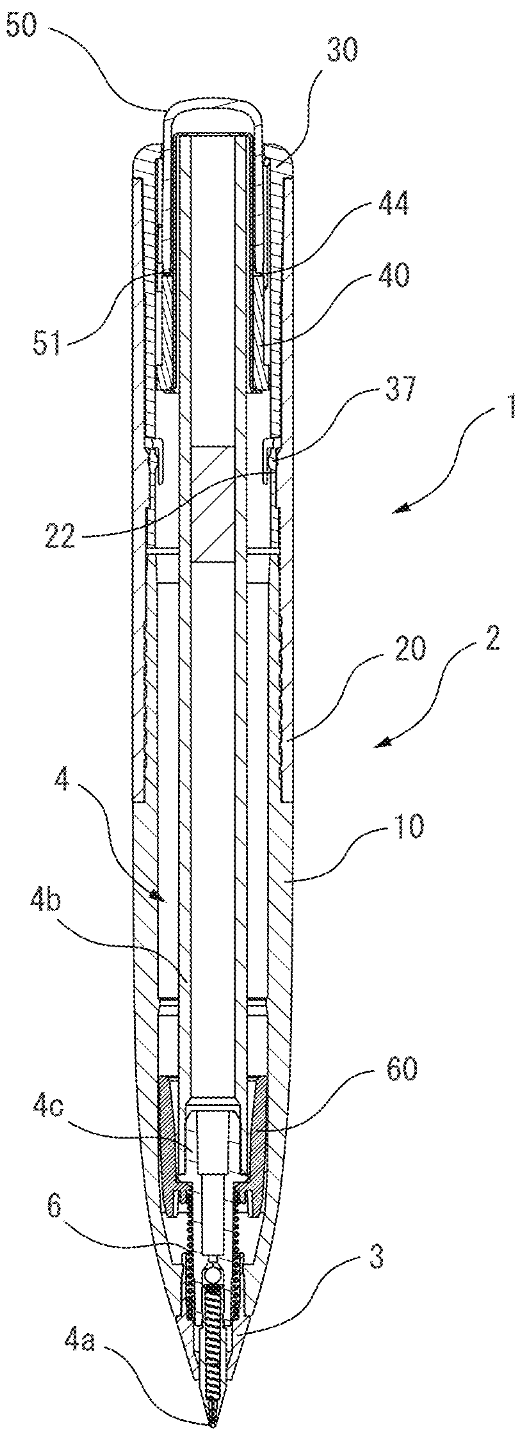
FIG. 3 is a vertical cross-sectional view of the knock type writing instrument of FIG. 1 in a writing state.
Figure 4:
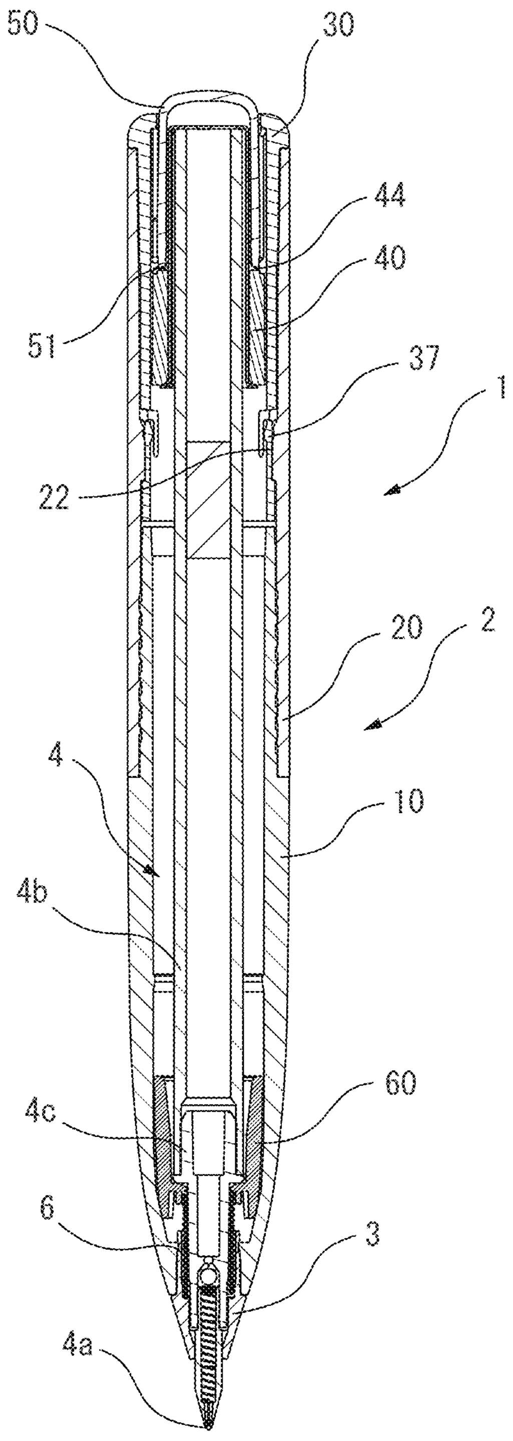
FIG. 4 is a vertical cross-sectional view of the knock type writing instrument of FIG. 1 in a state where a refill is further advanced from the writing state.

FIG. 1 is a side view of a first knock type writing instrument 1 in a nonwriting state, FIG. 2 is a vertical cross-sectional view of the knock type writing instrument 1 of FIG. 1, and FIG. 3 is a vertical cross-sectional view of the knock type writing instrument 1 of FIG. 1 in a writing state. Note that FIG. 4 is a vertical cross-sectional view of the knock type writing instrument 1 of FIG. 1 in the state where a refill 4 is further advanced from the writing state and a view explaining the later mentioned braking member 60.

The knock type writing instrument 1 has a shaft barrel 2 provided with a front shaft 10, a rear shaft 20 arranged at the rear of the front shaft 10, and an inside barrel 30 fit in the rear end part of the rear shaft 20, a tip member 3 fit in a front end part of the shaft barrel 2, and a refill 4 comprising a writing body arranged inside the shaft barrel 2 and provided with a writing part 4*a* at one end. In the following embodiment, the refill 4 is a refill of a ball point pen. In this Description, in the axial direction of the knock type writing instrument 1, the writing part 4*a* side is prescribed as the "front" side and the side opposite to the writing part 4*a* is prescribed as the "rear" side.

At a side surface of the shaft barrel 2, a clip member 5 comprised of a metal wire is attached. Inside of the shaft barrel 2, a spring 6 forming an elastic member biasing the refill 4 to the rear, a rotor 40 arranged at the rear of the refill 4, and an operating member 50 arranged to the rear of the rotor 40 are arranged. The knock type writing instrument 1 has a known knock mechanism. By performing a knock operation pressing the operating member 50 forward against the biasing force of the spring 6, a writing state where the writing part 4*a* of the refill 4 sticks out from the front end of the shaft barrel 2 (FIG. 3) and a nonwriting state where the writing part 4*a* retracts inside the shaft barrel 2 (FIG. 1 and FIG. 2) are switched between.

The refill 4 has the above-mentioned writing part 4*a*, a tubular refill body 4*b* able to store ink, and a joint member 4*c* connecting the writing part 4*a* and the tubular refill body 4*b*. At the outside surface of the front end part of the refill 4, a braking member 60 comprised of a tubular member is integrally arranged as a braking part.

Figure 5:
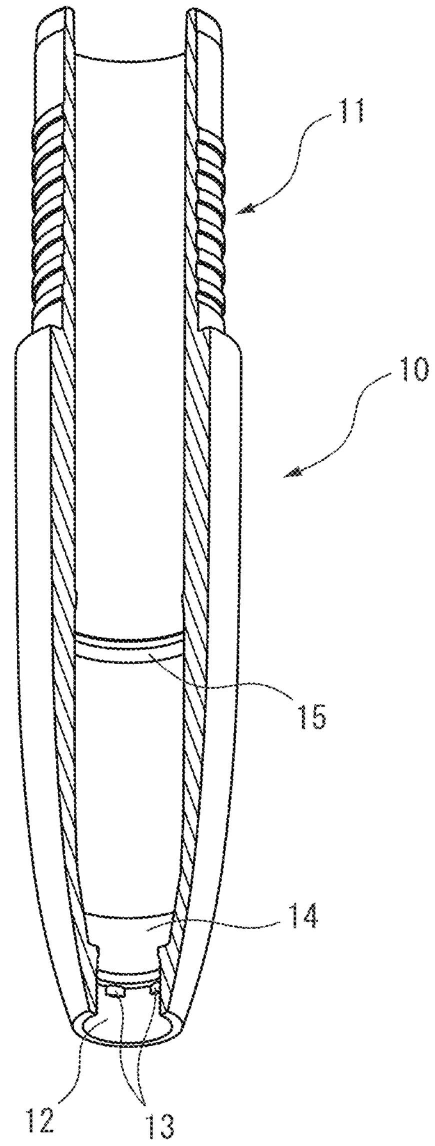
FIG. 5 is a partial cross-sectional view of a front shaft of the knock type writing instrument of FIG. 1.

FIG. 5 is a partial cross-sectional view of the front shaft 10 of the knock type writing instrument of FIG. 1. The front shaft 10 is a tubular member. At the outside surface of the rear end part of the front shaft 10, a male screw part 11 is formed for screwing with a female screw part 21 formed at the inside surface of the front end part of the rear shaft 20. At the inside surface of the front end part of the front shaft 10, a cylindrical surface 12 formed with the same inner diameter across the axial direction is formed. At the rear end part of the cylindrical surface 12, a plurality of projections 13 are formed arranged at equal intervals along the circumferential direction. The tip member 3 fits with the cylindrical surface 12 and the plurality of projections 13 and is attached to the shaft barrel 2, that is, the front shaft 10. At the inside surface of the front shaft 10 to the rear of the cylindrical surface 12, a tapered surface 14 of a larger diameter than the cylindrical surface 12, but gradually becoming smaller in inner diameter to the front is formed. To the rear of the tapered surface 14, a ring-shaped projection 15 is formed.

Figure 6:
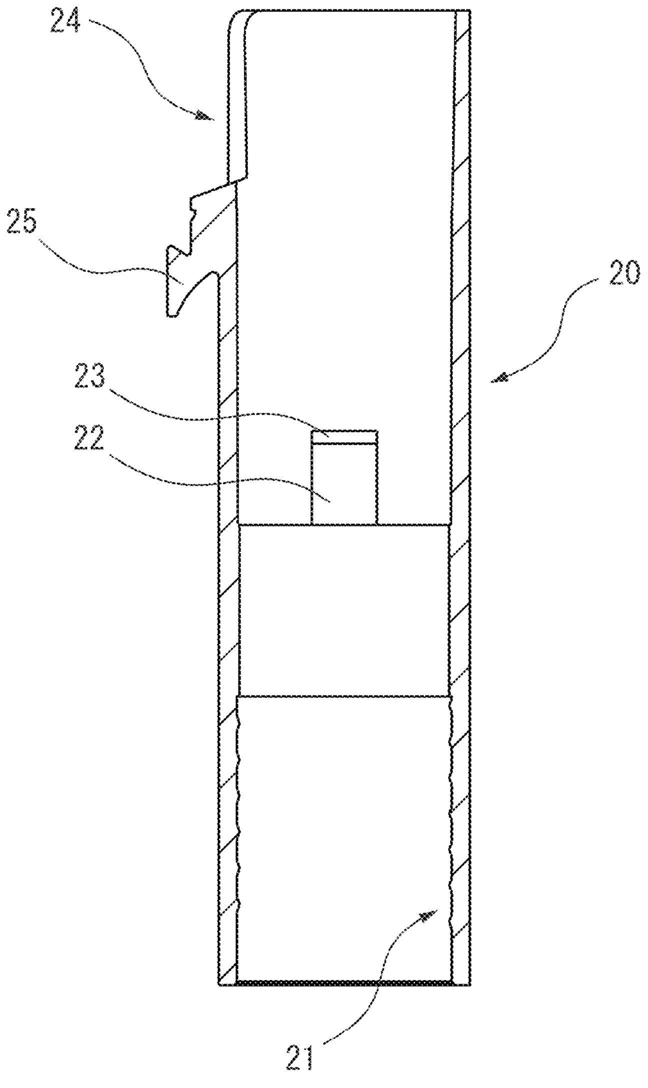
FIG. 6 is a vertical cross-sectional view of a rear shaft of the knock type writing instrument of FIG. 1.
Figure 7:
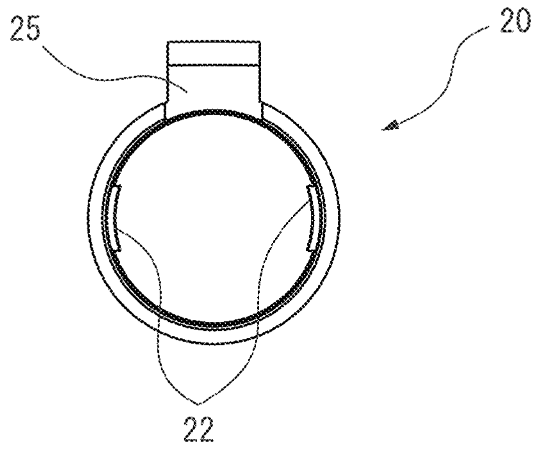
FIG. 7 is a front view of a rear shaft of FIG. 6.

FIG. 6 is a vertical cross-sectional view of the rear shaft 20 of the knock type writing instrument 1 of FIG. 1, while FIG. 7 is a front view of the rear shaft 20 of FIG. 6. The rear shaft 20 is a tubular member. At the inside surface of the front end part of the rear shaft 20, a female screw part 21 is formed to be screwed with the male screw part 11 of the front shaft 10. To the rear of the female screw part 21, two rectangular shaped narrowing parts 22 sticking out toward the inside in the radial direction are formed. The narrowing parts 22 are projections sticking out from the inside surface of the rear shaft 20 by uniform heights. The two narrowing parts 22 are arranged at positions facing each other across a center axis of the rear shaft 20. At the rear end parts of the narrowing parts 22, slanted surfaces 23 are provided. At the rear end part of the rear shaft 20, a rectangular cut part 24 extending from the rear end opening to the front is formed. To the front of the cut part 24, a first clip holding part 25 is formed. The first clip holding part 25 and the two narrowing parts 22 are arranged at positions exactly 90 degrees apart in the rotation direction about the center axis.

Figure 8:
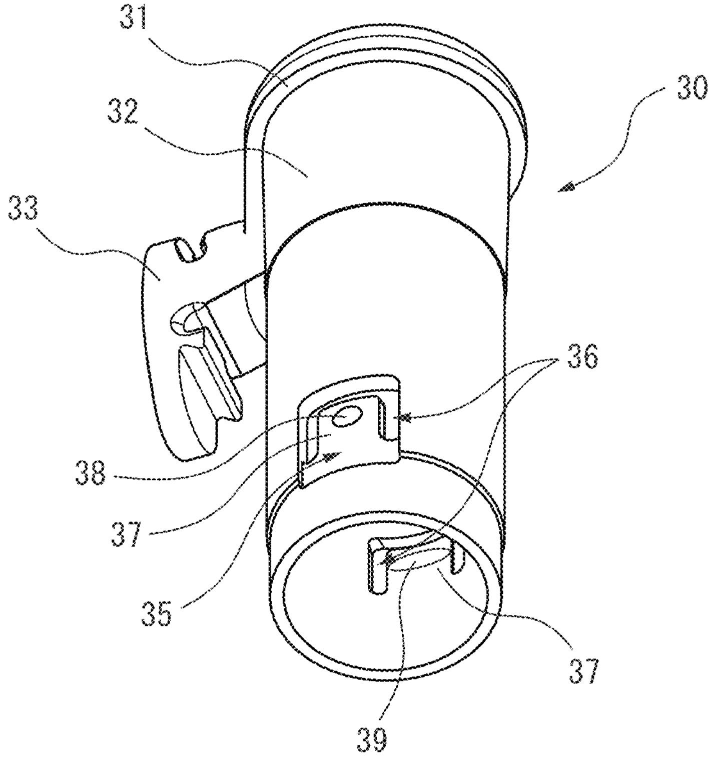
FIG. 8 is a perspective view of an inside barrel of the knock type writing instrument of FIG. 1.
Figure 9:
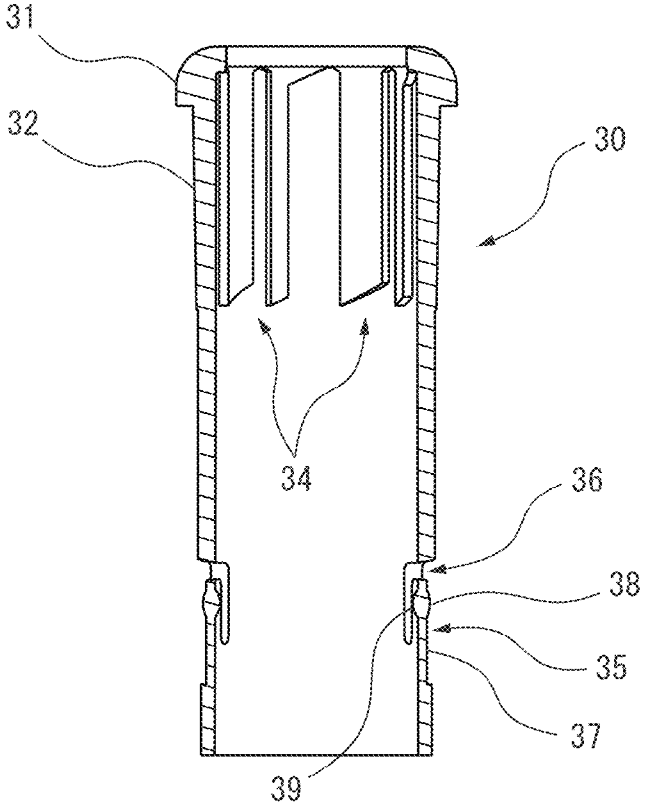
FIG. 9 is a vertical cross-sectional view of the inside barrel of FIG. 8.

FIG. 8 is a perspective view of the inside barrel 30 of the knock type writing instrument 1 of FIG. 1, while FIG. 9 is a vertical cross-sectional view of the inside barrel 30 of FIG. 8. The inside barrel 30 is a tubular member. At the outside surface of the rear end part of the inside barrel 30, a flange part 31 is formed. At the front of the flange part 31, a fitting surface 32 is formed. The fitting surface 32 is formed to a slightly larger diameter than the outside surface of the front. At the outside surface of the fitting surface 32, a second clip holding part 33 is formed connected with part of the flange part 31. At the inside surface of the rear end part of the inside barrel 30, an outside cams 34 are formed comprised of a plurality of projecting parts extending in the front-rear direction.

At the outside surface at the front of the inside barrel 30, two rectangular recessed parts 35 are formed. The recessed parts 35 are recessed parts formed with uniform depth from the outside surface of the inside barrel 30. The two recessed parts 35 are arranged at positions facing each other across the center axis of the inside barrel 30. The second clip holding part 33 and the two recessed parts 35 are arranged at positions separated by exactly 90 degrees in the rotational direction about the center axis. At the rectangular recessed parts 35, U-shaped holes 36 of substantially U-shapes each comprised of a through hole running along the rear edge and two through holes extending from the two end parts of the through hole to the front are formed. Due to the U-shaped holes 36, elastically deformable parts 37 are defined at the insides of the recessed parts 35.

The elastically deformable parts 37 are cantilever shapes extending inside the recessed parts 35 to the rear. At the outside surfaces of the elastically deformable parts 37, first projecting parts 38 are formed sticking out to the outside in the radial direction. At the inside surfaces of the elastically deformable parts 37, second projecting parts 39 are formed sticking out to the inside in the radial direction. The first projecting parts 38 and second projecting parts 39 are spherical surface projections. The circumscribed circle of the two first projecting parts 38 is formed to become just slightly larger than the diameter of the inscribed circle of the two narrowing parts 22 of the rear shaft 20. Further, the circumscribed circle of the two first projecting parts 38 is formed to become just slightly smaller than the outer diameter of the inside barrel 30. The inscribed circle of the two second projecting parts 39 is formed to be just slightly smaller than the outer diameter of the front end part of the rotor 40, specifically just slightly smaller than the outer diameter of the cam member 41 of the rotor 40.

Figure 10:
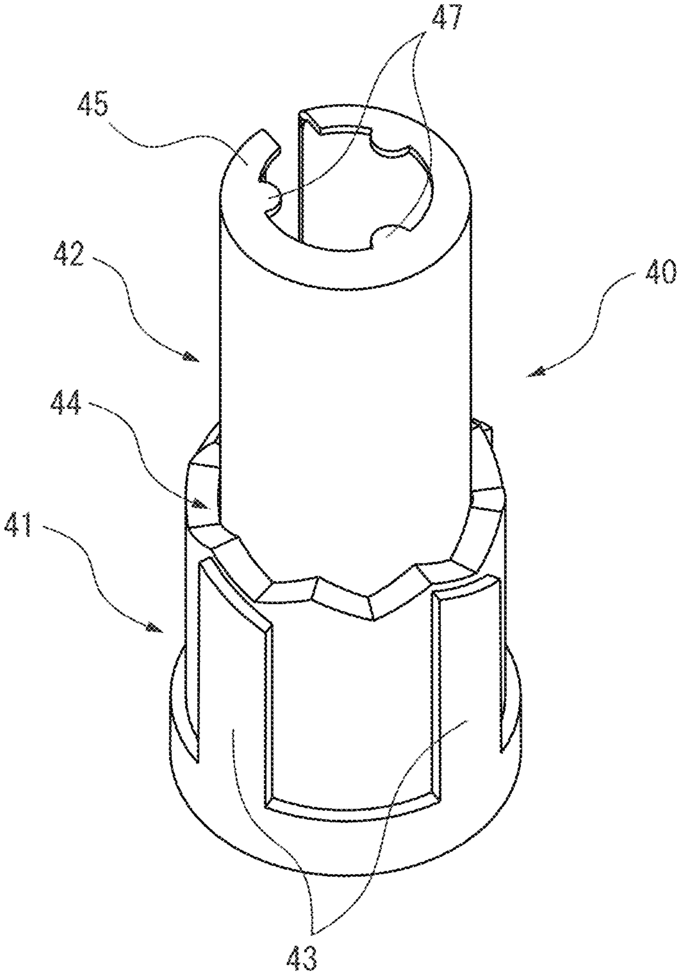
FIG. 10 is a perspective view of a rotor of the knock type writing instrument of FIG. 1.
Figure 11:
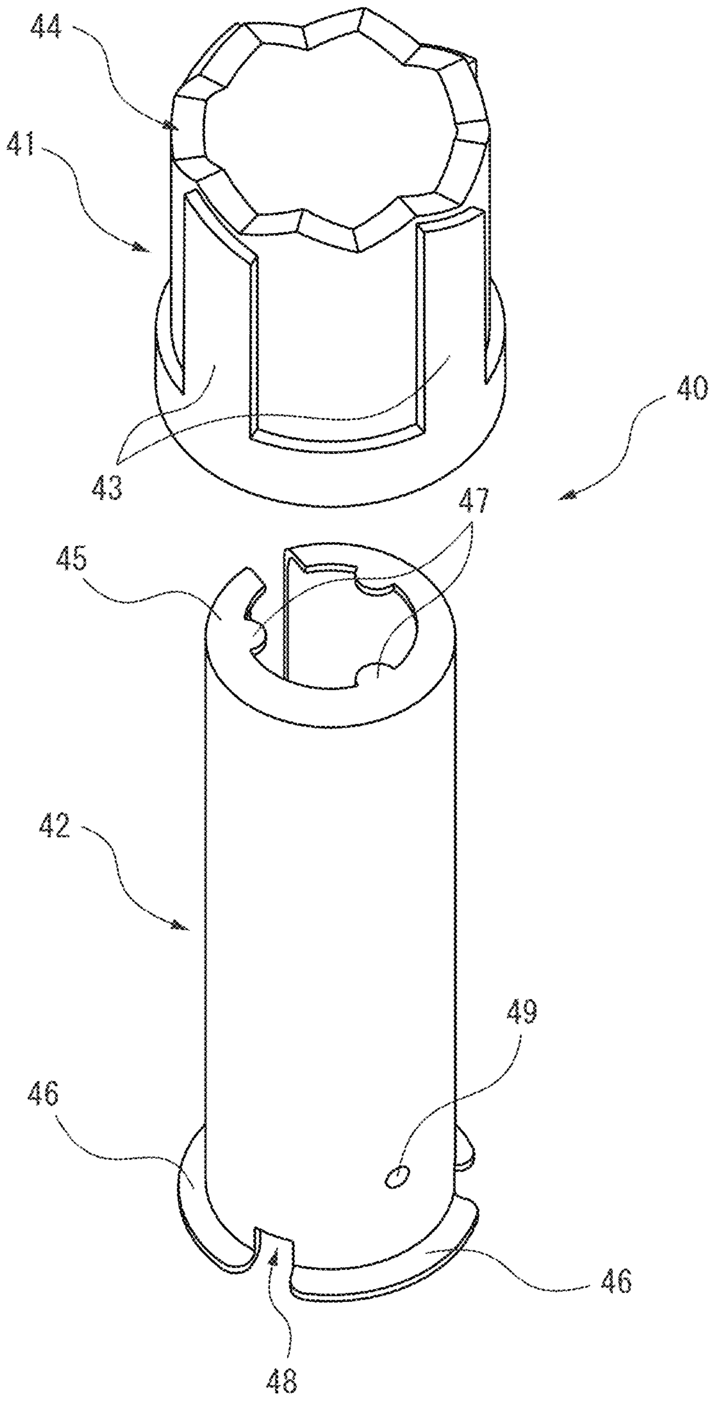
FIG. 11 is a disassembled perspective view of the rotor of FIG. 10.

FIG. 10 is a perspective view of the rotor 40 of the knock type writing instrument of FIG. 1, while FIG. 11 is a disassembled perspective view of the rotor 40 of FIG. 10. The rotor 40 is a tubular member comprised of a combination of two separate tubular members, that is, the cam member 41 and the received member 42.

The cam member 41 is fabricated by injection molding etc. of a polypropylene, polyacetal, or other plastic material the same as the front shaft 10 and rear shaft 20 etc. At the outside surface of the cam member 41, a plurality of inside cams 43 comprised of projecting parts extending in the front-rear direction are provided at equal intervals along the circumferential direction. The inside cams 43 can be arranged between the outside cams 34 formed at the inside barrel 30 and cooperate with the outside cams 34. At the rear end face of the cam member 41, a cam receiving surface 44 is formed configured so as to cooperate with the cam face 51 of the operating member 50 (FIG. 2). The outer diameter of the cam member 41 is formed to become just slightly smaller than the inner diameter of the inside barrel 30.

The received member 42 is fabricated by working a metal sheet by bending etc. Specifically, a rectangular metal sheet member is prepared, and the edge part positioned at the rear side when arranged at the knock type writing instrument 1 is bent to one side by exactly 90 degrees to form a rear end edge part 45. Further, the edge part positioned at the front side is bent to the other side by exactly 90 degrees to form a front end edge part 46. Next, the metal sheet is bent into a cylinder to obtain a tubular received member 42. In the received member 42, the rear end edge part 45 sticks out in a substantially ring shape to the inside in the radial direction while the front end edge part 46 sticks out in a substantially ring shape to the outside in the radial direction. The outer diameter of the front end edge part 46 is formed smaller than the outer diameter of the cam member 41. The axial direction length of the received member 42 is longer than the axial direction length of the cam member 41. Therefore, in the assembled state, the received member 42 sticks out to the rear from the rear end of the cam member 41. The two end faces in the circumferential direction after bending to a cylinder may be separated as shown in FIG. 11 or may be made to abut against each other.

At the rear end edge part 45, three semicircular locking parts 47 sticking out further to the inside in the radial direction are formed. The three locking parts 47 are provided at equal intervals along the circumferential direction. At the front end edge part 46, three cut parts 48 are formed extending to the rear. The three cut parts 48 are provided at equal intervals along the circumferential direction. Due to the formation of the cut parts 48, it is possible to smoothly bend the front end edge part 46 when bending the metal sheet member into a cylinder when fabricating the received member 42. At the outside surface of the received member 42, a bump shaped holding projection 49 is formed.

The rotor 40 is assembled by insertion of the received member 42 from the front end opening of the cam member 41. That is, the received member 42 inserted into the cam member 41 is inserted until the front end edge part 46 abuts against the front end face of the cam member 41. By the rear end face of the bent front end edge part 46 abutting against the front end face of the cam member 41, movement of the received member 42 to the rear, that is, detachment, is prevented. The inner diameter of the cam member 41 is formed the same as or just slightly larger than the outer diameter of the received member 42. The cam member 41 and the received member 42 are fastened by the holding projection 49 of the received member 42 locking with the inside surface of the cam member 41. The received member 42 is configured so as to be received inside the operating member 50. The outer diameter of the received member 42 is formed just slightly smaller than the inner diameter of the operating member 50. Due to this, the operating member 50 can move in the axial direction with respect to the received member 42 and in turn the rotor 40.

At the rotor 40, the cam member 41 is provided with the function of the rotor used for a conventional knock mechanism. That is, in the knock type writing instrument 1 in the nonwriting state, if performing a knock operation pressing the operating member 50 to the front against the biasing force of the spring 6, the rotor 40 and in turn the refill 4 advance together with the operating member 50. If the inside cams 43 of the rotor 40 arranged between the outside cams 34 of the inside barrel 30 move beyond the outside cams 34 in the axial direction, the cam face 51 of the operating member 50 and the cam receiving face 44 of the rotor 40 cooperate and make the rotor 40 rotate about the center axis. Next, if the pressing force on the operating member 50 is released, the biasing force of the spring 6 causes the rotor 40 to retract, the rear end faces of the inside cams 43 and the front end faces of the outside cams 34 lock, and the knock type writing instrument 1 enters the writing state. If again performing a knock operation in this state, the rotor 40 advances together with the operating member 50 and the lock between the inside cams 43 and the outside cams 34 is released. Due to this, the cam face 51 of the operating member 50 and the cam receiving face 44 of the rotor 40 cooperate and make the rotor 40 rotate about the center axis. Next, if the pressing force on the operating member 50 is released, the biasing force of the spring 6 causes the rotor 40 to retract together with the refill 4 and again the inside cams 43 are arranged between the outside cams 34 and the knock type writing instrument 1 becomes the nonwriting state.

The received member 42 is configured to receive the refill 4 inside it over the full length of the received member 42. Due to this, the knock type writing instrument 1 can be made shorter and thinner. That is, in general, in a knock type writing instrument, the refill moves back and forth together with the rotor whereby the knock type writing instrument enters the writing state or the nonwriting state. Therefore, the total length of the knock type writing instrument cannot be made shorter than the length of the refill and rotor as a whole in the integrated state. Thus, by the knock type writing instrument 1 being configured so that the refill 4 is received over the full length of the received member 42 and in turn the rotor 40, the total length can be made shorter compared with another knock type writing instrument having a refill 4 of the same length.

Furthermore, the received member 42 is fabricated from a metal sheet. For this reason, compared to if fabricating a similar tubular member from a plastic, the wall thickness can be made thinner, that is, the length in the radial direction can be shortened to the sheet thickness. In more detail, in general, in the rotor, the cam part corresponding to the cam member 41 in the rotor 40 explained above and cooperating with the operating member and the received part corresponding to the received member 42 and received in the operating member are formed integrally. The cam part is formed in a larger diameter than the received part. If, to make the knock type writing instrument thinner, the rear end part of the refill is made to abut against the front end face of the rotor instead of the rear end part of the refill being received inside of the rotor like in the later explained third knock type writing instrument 200, the total length of the knock type writing instrument becomes longer by exactly that amount. On the other hand, if making the rear end part of the refill be received inside of the rotor over its full length to make the total length of the knock type writing instrument shorter, the outer diameter of the part of the received part becomes larger. This being so, the outer diameter of the cam part must also be made larger to provide a cam receiving face cooperating with the operating member. As a result, the knock type writing instrument ends up becoming thicker. If making the rear end part of the refill be received inside of the part of the cam part of the rotor, the knock type writing instrument becomes longer by exactly the amount of the length of the received part instead of being able to make the knock type writing instrument thinner.

At the knock type writing instrument 1, by configuring the rotor 40 from the two parts of the cam member 41 and the received member 42 and making the received member 42 from a metal sheet, it is possible to keep down the production costs while making the knock type writing instrument 1 shorter and thinner.

The front end edge part 46 may be configured in any way so long as able to lock with the cam member 41 and thereby prevent detachment of the received member 42. For example, it is possible to make the ratio of formation of the front end edge part 46 in the circumferential direction half or less. In this case, the cut parts 48 need not be formed. Further, instead of the front end edge part 46, one or more semicircular shaped, rectangular shaped, or other locking parts sticking out to the outside in the radial direction like the locking parts 47 provided at the rear end edge part 45 may be formed.

The refill 4 inserted into the received member 42 is kept from moving rearward, that is, from detaching, by the rear end edge part 45 bent to the inside in the radial direction. Note that, the shorter the length of the rear end edge part 45 in the radial direction, in other words, the length of the bent part, the easier it is to bend the part into a cylinder, but if too short, for example, if trying to insert a thin refill into the received member 42, the refill will sometimes end up detaching to the rear. In the received member 42, due to the provision of the locking parts 47, it is possible to lock with a thinner refill 4 which would not lock with the rear end edge part 45 and thereby prevent detachment while improving the workability. The received member 42 may also have at least one locking part 47 sticking out to the inside in the radial direction instead of having the rear end edge part 45 so long as detachment of the refill 4 to the rear can be prevented. Two or more locking parts 47 are preferably provided. The two or more locking parts 47 are preferably arranged at equal intervals along the circumferential direction. The locking parts 47 need not be semicircular in shape and may also be rectangular in shape.

Figure 12:
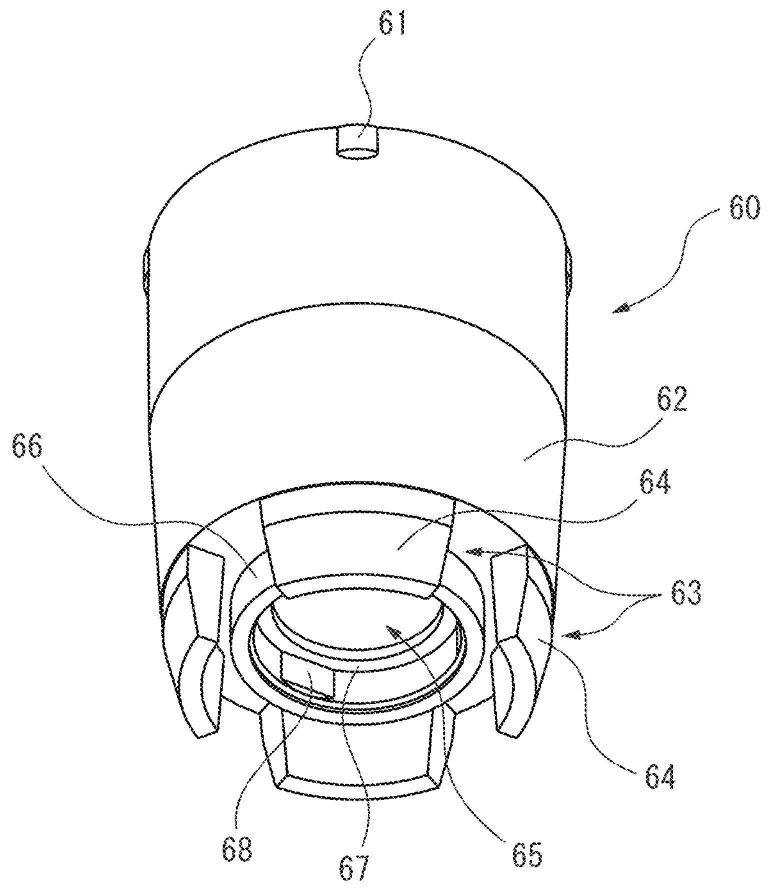
FIG. 12 is a perspective view of a braking member of the knock type writing instrument of FIG. 1.
Figure 13:
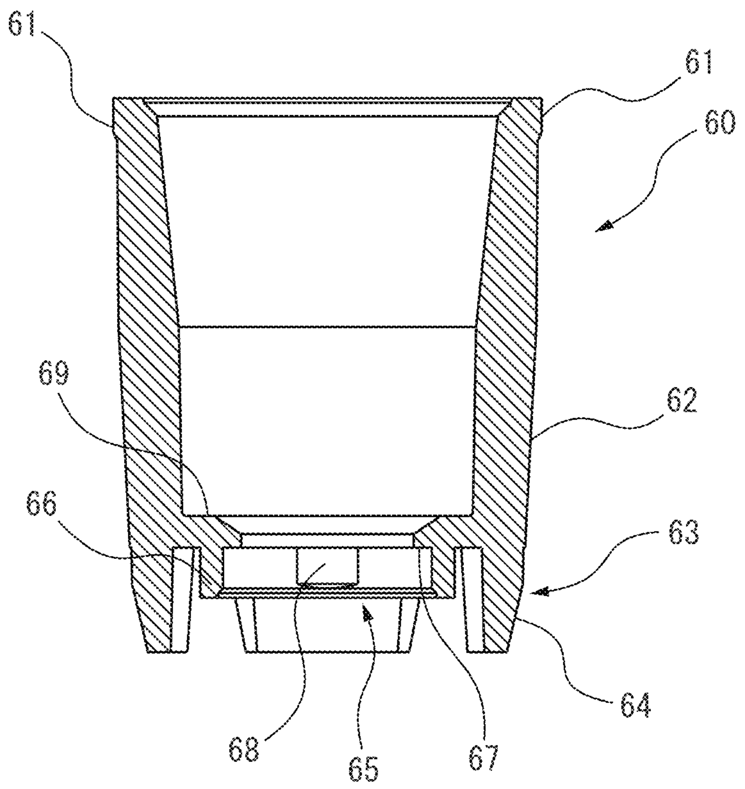
FIG. 13 is a vertical cross-sectional view of the braking member of FIG. 12.

FIG. 12 is a perspective view of a braking member 60 of the knock type writing instrument 1 of FIG. 1, while FIG. 13 is a vertical cross-sectional view of the braking member 60 of FIG. 12. The braking member 60 is a tubular member. The braking member 60 is attached to the refill 4 so that its bottom becomes the front side of the knock type writing instrument 1 and its top becomes the rear side of the knock type writing instrument 1 in FIG. 12 and FIG. 13.

At the outside surface of the rear end part of the braking member 60, four projections 61 are formed at equal intervals along the circumferential direction. At the outside surface of the front half of the braking member 60, a tapered part 62 is formed with an inner diameter becoming gradually smaller toward the front. Near the circumferential edge of the front end face of the braking member 60, four braking projections 63 are formed sticking out toward the front and arranged at equal intervals along the circumferential direction. In the cross-section of the braking member 60 perpendicular to the axial direction, that is, the vertical cross-section, the vertical cross-sections of the braking projections 63 are arc shapes centered about the center axis of the braking member 60. The diameter of the circumscribed circle at the rear ends of the four braking projections 63 is just slightly smaller than the outer diameter of the tapered part 62 at its front end.

At the outside surfaces of the braking projections 63, that is, the surfaces facing to the outside in the radial direction, braking tapered surfaces 64 are formed with a diameter of the circumscribed circle of the four braking projections 63 becoming gradually smaller toward the front. The braking tapered surfaces 64 are formed complementary with parts of the tapered surface 14 provided at the shaft barrel 2 side. On the other hand, at the inside surfaces of the braking projections 63, that is, at the surfaces facing to the inside in the radial direction, the diameter of the inscribed circle of the four braking projections 63 become the same. Therefore, the braking projections 63 are formed so as to become gradually thinner toward the front. The braking projections 63 are cantilever shapes, so have flexibility to the inside in the radial direction and to the outside in the radial direction with respect to force in the radial direction. In particular, the braking projections 63 become gradually thinner toward the front, so the front parts of the braking projections 63 have greater flexibility than the rear parts.

At the front end face of the braking member 60, a through hole 65 through which the refill 4 is inserted is formed. Around the through hole 65 at the front end face of the braking member 60, a tubular projection 66 is formed sticking out to the front. The amount of projection of the tubular projection 66 from the front end face of the braking member 60 is smaller than, or about half of, the amounts of projection of the braking projections 63. Around the through hole 65, a ring-shaped spring support surface 67 is formed defined by the through hole 65 and tubular projection 66. At the inside surface of the tubular projection 66, three spring holding projections 68 are formed arranged at equal intervals along the circumferential direction. At the inside surface of the front end part of the braking member 60, a ring-shaped abutting surface 69 is formed.

Figure 14:
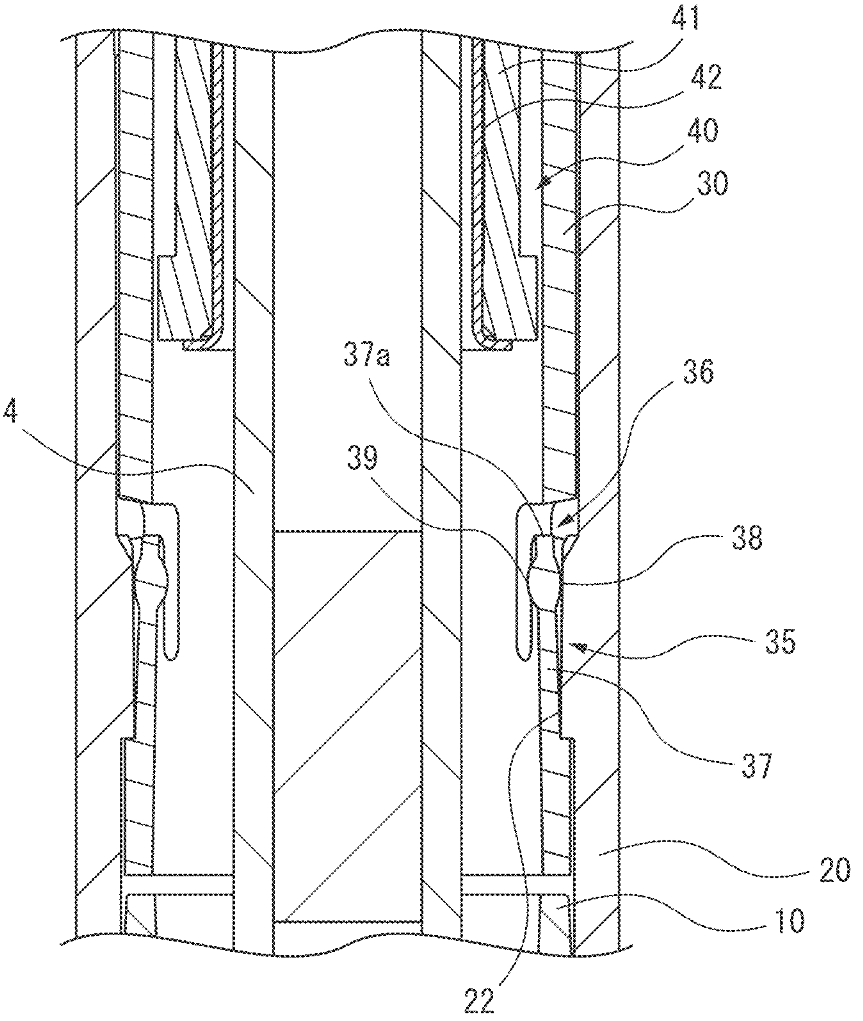
FIG. 14 is an enlarged view of a vicinity of an elastically deformable part of the knock type writing instrument of FIG. 3.

The assembly of the knock type writing instrument 1 will be explained below while referring to mainly FIG. 2 and furthermore FIG. 14. FIG. 14 is an enlarged view of the vicinity of an elastically deformable part 37 of the knock type writing instrument 1 of FIG. 3.

First, the integral rotor 40 and operating member 50 in the state where the received member 42 is received in the operating member 50 is pressed and inserted inside the inside barrel 30 from the front end opening, for example, in the state with the front end opening facing vertically upward. At this time, as explained above, the inscribed circle of the two second projecting parts 39 of the inside barrel 30 is formed just slightly smaller than the outer diameter of the cam member 41 of the rotor 40. On the other hand, the elastically deformable parts 37 where the second projecting parts 39 are provided are cantilever shapes extending to the rear, so can elastically deform to the inside in the radial direction and to the outside in the radial direction. Therefore, the rotor 40 and the operating member 50 press the second projecting parts 39 to make the elastically deformable parts 37 deform to the outside in the radial direction while being inserted deep into the inside barrel 30. The deformed elastically deformable parts 37 return to the original state at the instant where the rotor 40 and the operating member 50 passes the second projecting parts 39. Note that, first the operating member 50 may be inserted to the inside of the inside barrel 30 and then the rotor 40 pressed and inserted to the inside of the inside barrel 30.

In this state, if the front end opening of the inside barrel 30 is made to face vertically downward, the rotor 40 and the operating member 50 move downward due to their weights. Movement of the rotor 40 and the operating member 50 is stopped by the rotor 40 locking with the second projecting parts 39. At this time, the second projecting parts 39 are pressed due to the weights of the rotor 40 and the operating member 50, but the elastically deformable parts 37 will never deform to the outside in the radial direction. In other words, the rigidity of the elastically deformable parts 37 is set so that the elastically deformable parts 37 do not deform due to the force due to the weights of the rotor 40 and the operating member 50. The rigidity of the elastically deformable parts 37 is suitably set by adjusting the wall thickness and shape or dimensions of the elastically deformable parts 37.

Therefore, even if the front end opening of the inside barrel 30 is made to face vertically downward, the rotor 40 and the operating member 50 will never drop off from the inside barrel 30. In short, by the inside barrel 30 having the elastically deformable parts 37 and second projecting parts 39, for example, even if the front end opening of the inside barrel 30 is mistakenly made to face vertically downward before moving on to the next assembly step in the state where the rotor 40 and the operating member 50 are assembled at the inside barrel 30, it is possible to prevent the rotor 40 and the operating member 50 from ending up dropping off. On the other hand, at the time of assembly work, depending on the assembly apparatus or the worker, the rotor 40 and the operating member 50 will be pressed, so the elastically deformable parts 37 will be made to deform and the rotor 40 and the operating member 50 can be easily inserted down to the depth of the inside barrel 30.

Next, the inside barrel 30 in the state with the rotor 40 and the operating member 50 assembled is pressed and inserted inside the rear shaft 20 from the rear end opening. The outer diameter of the front end part of the inside barrel 30 is just slightly larger than the diameter of the inscribed circle of the narrowing parts 22 of the rear shaft 20. However, the rear end parts of the narrowing parts 22 of the rear shaft 20 are formed with slanted surfaces 23, so the front end edge of the inside barrel 30 can ride over the narrowing parts 22 and the inside barrel 30 can be inserted deep. The inside barrel 30 is inserted into the rear shaft 20 by the first clip holding part 25 of the rear shaft 20 and the second clip holding part 33 of the inside barrel 30 being aligned in the axial direction. Due to this, the second clip holding part 33 of the inside barrel 30 is received inside a cut part 24, and the second clip holding part 33 fits with the first clip holding part 25. At that time, the front end face of the flange part 31 of the inside barrel 30 abuts against the rear end face of the rear shaft 20, and the fitting surface 32 fits with the inside surface of the rear end part of the rear shaft 20. In this way, the inside barrel 30 finishes being fit with the rear shaft 20. Note that, the clip member 5 is attached to the shaft barrel 2 by the first clip holding part 25 and second clip holding part 33.

Referring to FIG. 14, in the state where the inside barrel 30 is attached to the rear shaft 20, the narrowing parts 22 of the rear shaft 20 are housed inside the recessed parts 35 of the inside barrel 30. Due to this, even if a force acts on the inside barrel 30 causing it to pull out from the rear shaft 20, the front end edges of the narrowing parts 22 of the rear shaft 20 are locked with the step parts at the front of the recessed parts 35 of the inside barrel 30 and the inside barrel 30 is prevented from detaching from the rear shaft 20. Furthermore, the first projecting parts 38 of the elastically deformable parts 37 abut against the narrowing parts 22 of the rear shaft 20 and cause the elastically deformable parts 37 to elastically deform so as to curve to the inside in the radial direction. As a result, the rear end edges 37_a_ of the inside surfaces of the elastically deformable parts 37 stick out to the inside in the radial direction from the cylindrical shape outside surface of the cam member 41 of the rotor 40.

In this state, if turning the front end opening of the rear shaft 20 vertically downward, the rotor 40 and the operating member 50 move downward due to their weights. Movement of the rotor 40 and the operating member 50 stops by the front end edge or front end face of the rotor 40 locking with the rear end edges 37_a_ or rear end faces of the elastically deformable parts 37. Therefore, at the time of replacement of the refill etc., even if the front end opening of the rear shaft 20 is made to face vertically downward, the rotor 40 will never unintentionally drop off from the rear shaft 20 and inside barrel 30. Further, compared with the inside barrel 30 before attachment to the rear shaft 20, the elastically deformable parts 37 elastically deform to the inside in the radial direction more, whereby it is possible to prevent the rotor 40 and the operating member 50 from dropping off more reliably.

Note that, the rotor 40 and the operating member 50 may be inserted inside the rear shaft 20 and inside barrel 30 after attaching the inside barrel 30 to the rear shaft 20. That is, the elastically deformable parts 37 are cantilever shapes extending to the rear inside the recessed parts 35, so even if curved to the inside in the radial direction, it is possible to insert the rotor 40 and the operating member 50 along the curve accompanied with elastic deformation.

As assembly work, the refill 4 is inserted from the rear end opening of the braking member 60. The front end face of the joint member 4_c_ of the refill 4 is made to abut against the abutting face 69 of the inside of the braking member 60, whereby the outside surface of the refill 4 and the inside surface of the braking member 60 are fit together. Next, the spring 6 is inserted inside the front shaft 10 to where the tip member 3 is fit from the rear end opening of the front shaft 10. Next, the refill 4 to which the braking member 60 is attached is inserted into the front shaft 10 from the rear end opening, and the front end part of the refill 4, that is, the writing part 4*a*, is arranged inside of the spring 6. The braking member 60 plays the role of a guide when inserting the refill 4 into the front shaft 10.

The front end part of the spring 6 is arranged at the step part at the inside of the tip member 3, while the rear end part of the spring 6 is arranged at a spring support surface 67. For this reason, in the assembled state, the biasing force of the spring 6 is transmitted through the braking member 60 and furthermore the refill 4 to the rotor 40. Movement of the spring 6 in the radial direction is limited by a spring holding projection 68. Next, the rear shaft 20 with the inside barrel 30 attached is screwed with the front shaft 10 whereby the knock type writing instrument 1 finishes being assembled. The braking member 60 may also be arranged so as to move integrally with the refill 4 inside the shaft barrel 2. Therefore, in addition to integral fitting with each other as explained above, it is also possible to make the front end face of the joint member 4*c* of the refill 4 and the abutting face 69 of the inside of the braking member 60 constantly abut against each other by the biasing force of the spring 6 in the state where the braking member 60 is loosely inserted with respect to the refill 4.

According to the knock type writing instrument 1, it is possible to provide a writing instrument which is easy to assemble and disassemble. Specifically, the rotor 40 and the operating member 50 are inserted into the inside barrel 30 alone, but as explained above, even if the inside barrel 30 is turned upside down after the insertion of the rotor 40 and the operating member 50, the rotor 40 and the operating member 50 will never drop off. Therefore, the inside barrel 30 can be attached to the rear shaft 20 without being concerned with the posture of the inside barrel 30. On the other hand, if ending up mistaking the rotor 40 inserted into the inside barrel 30, for example, if ending up mistaking the color of the parts, the operating member 50 is pressed to the front from the rear of the inside barrel 30. Due to this, in the same way as the time of assembly, the rotor 40 and the operating member 50 can press the second projecting parts 39 to make the elastically deformable parts 37 deform to the outside in the radial direction and pass the second projecting parts 39 and then take out the rotor 40 and the operating member 50 from the front end opening of the inside barrel 30. Therefore, the knock type writing instrument 1 can be easily assembled and can be easily disassembled. Further, the disassembled parts can be used for easy reassembly.

Note that, regarding the function of prevention of the elastically deformable parts 37 dropping off explained above, not only the relationship of the first tubular member comprised of the rear shaft 20, the second tubular member comprised of the inside barrel 30, and the inside member comprised of the rotor 40, but also the other two tubular members and the inside member as well may be similarly applied. For example, the first tubular member may also be the front shaft, the second tubular member may be the rear shaft, and the inside member may be the operating member. In this case, the elastically deformable parts are formed at the rear shaft. Further, in addition to a knock type writing instrument, the invention can be applied to a cap type writing instrument or other general writing instrument.

The elastically deformable parts 37 are cantilever shapes extending to the rear, but may also be cantilever shapes extending to the front or may also be cantilever shapes extending in the circumferential direction. In addition, the elastically deformable parts may be configured in any way so long as elastically deforming in the radial direction. The first projecting parts 38 comprising the first locking parts and the second projecting parts 39 comprising the second locking parts are spherical shaped projections, but may also be projections of other shapes so long as cooperating with the rear shaft 20 and the rotor 40 to make the elastically deformable parts 37 elastically deform. In short, the first locking parts may be configured in any way so long as making the elastically deformable parts elastically deform to the inside in the radial direction and the second locking parts may be configured in any way so long as making the elastically deformable parts elastically deform to the outside in the radial direction. Therefore, for example, the first locking parts may also be provided at the rear shaft side. Specifically, the projecting parts may be provided at just the narrowing parts 22, and the narrowing parts 22 may be made to stick out more to the inside in the radial direction. The narrowing parts 22 may similarly be configured in any way so long as making the elastically deformable parts elastically deform to the inside in the radial direction. Like in later explained second knock type writing instrument 100, it is also possible to omit the narrowing parts and make the first projecting parts stick out more. The narrowing parts 22 and first projecting parts 38 may be jointly made the first locking parts.

In short, the writing instrument may be configured in any way so long as comprising a cylindrical first tubular member, a cylindrical second tubular member inserted inside the first tubular member from one end part of the first tubular member, the second tubular member provided at its side surface with elastically deformable parts able to elastically deform to the outside and to the inside in a radial direction, and a cylindrical or columnar inside member inserted inside the second tubular member from one end part of the second tubular member, having first fitting parts at an outside surface of the elastically deformable parts or an inside surface of the first tubular member, and having second fitting parts at the inside surfaces of the elastically deformable parts, the first fitting parts being configured so as to make the elastically deformable parts deform to the inside in the radial direction if the second tubular member is inserted inside the first tubular member, the second fitting parts being configured so as to make the elastically deformable parts deform to the outside in the radial direction if the inside member is inserted inside the second tubular member in the state before the second tubular member is inserted inside the first tubular member and make the deformed elastically deformable parts return after insertion of the inside member.

Figure 15:
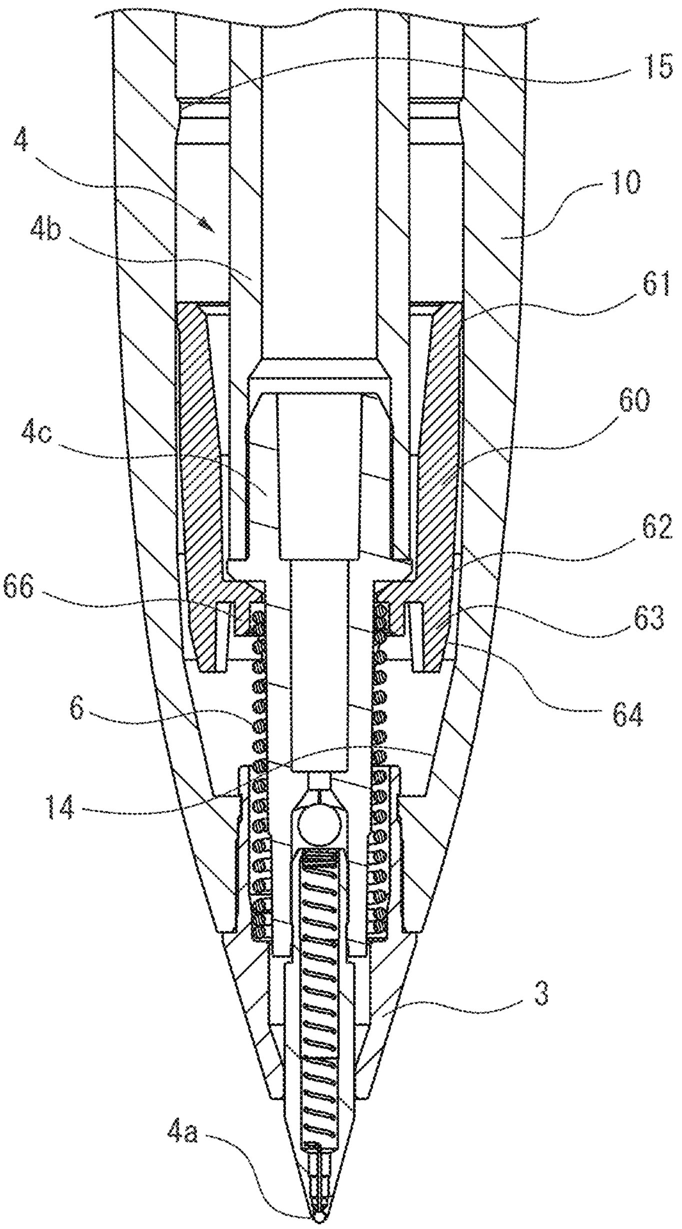
FIG. 15 is an enlarged view of a front end part of the knock type writing instrument of FIG. 3.

Next, referring to FIG. 15 and FIG. 16, the function of the braking member 60 will be explained. FIG. 15 is an enlarged view of a front end part of the knock type writing instrument 1 of FIG. 3, while FIG. 16 is an enlarged view of a front end part of the knock type writing instrument 1 of FIG. 4.

In the nonwriting state or the writing state, sometimes an impact is applied to the refill at the time of advance of the refill. The impact at the time of advance of the refill occurs due to, for example, the knock type writing instrument ending up being mistakenly dropped and the knock type writing instrument vertically impacting the floor surface etc. from the rear end part etc. At this time, the refill strongly moves forward and goes beyond the advancing position of a usual knock operation. As a result, it impacts the inside surface of the shaft barrel and the refill is liable to be damaged.

In the knock type writing instrument 1 in the writing state shown in FIG. 15, the braking member 60, specifically the braking projections 63, does not elastically deform. The braking projections 63, in particular the braking tapered surfaces 64, move away from the inside surface of the shaft barrel 2, that is, the inside surface of the front shaft 10. The braking member 60 is pressed against the joint member 4*c* of the refill 4 by the biasing force of the spring 6. Further, at least one of the four projections 61 formed at the outside surface of the rear end part of the braking member 60 abuts against the inside surface of the front shaft 10, whereby the refill 4 is positioned so that the center axis of the refill 4 and the center axis of the shaft barrel 2 match.

Figure 16:
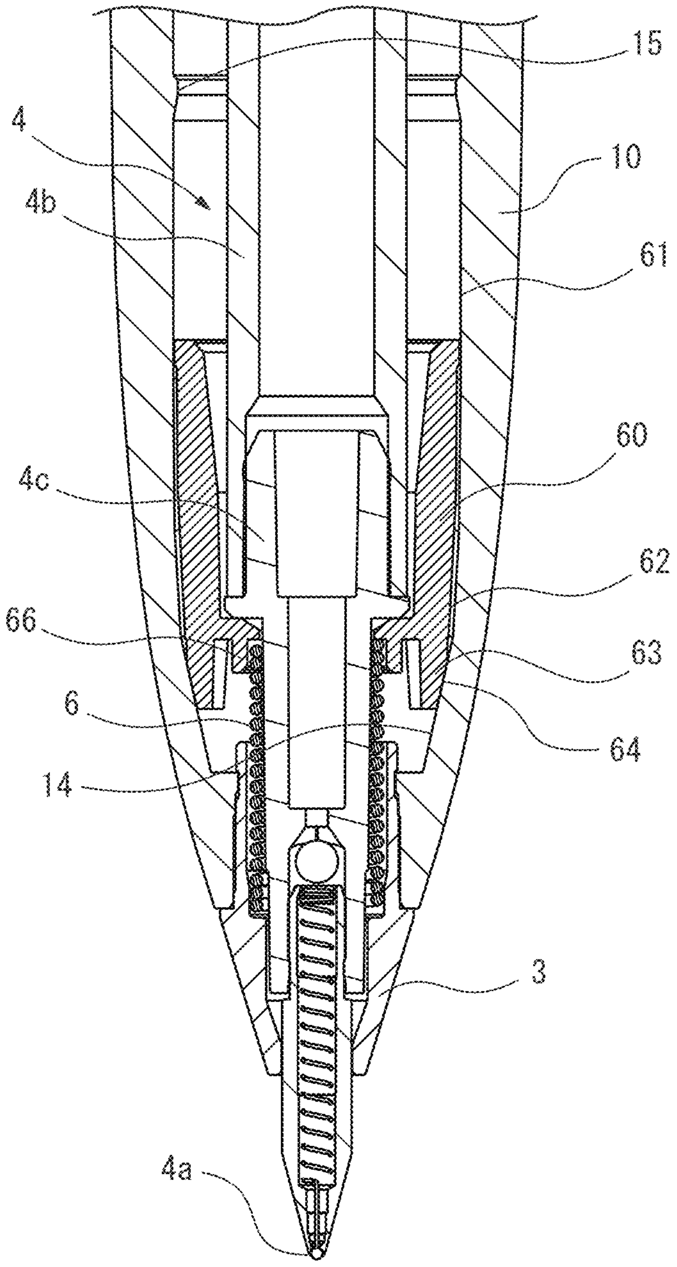
FIG. 16 is an enlarged view of a front end part of the knock type writing instrument of FIG. 4.

The knock type writing instrument 1 in the state shown in FIG. 15 becomes the state shown in FIG. 16 if the refill 4 strongly moves forward. That is, along with the advance of the braking member 60, the braking tapered surfaces 64 of the braking projections 63 slide against the tapered surface 14 of the front shaft 10, and braking projections 63 receive force at the inside in the radial direction from the tapered surfaces 14 and elastically deform. Due to the frictional resistance due to the sliding contact of the braking tapered surfaces 64 and the tapered surface 14 and the elastic deformation of the braking projections 63, the kinetic energy of the refill 4 and braking member 60 decreases and finally the impact received by the refill 4 is eased. In short, the braking projections 63 of the braking member 60 and tapered surfaces 14 cooperate and damage to the refill 4 is prevented.

Due to the above, at the knock type writing instrument 1, it is possible to ease the impact applied at the time of advance of the refill 4 by a simple mechanism. Note that, if the braking member 60 elastically deforming to ease impact is locked with respect to the inside surface of the front shaft 10, it is possible to return to the original writing state by pressing the writing part 4*a* against the writing surface. Further, the spring constant of the spring 6 may be set so that the braking member 60 automatically returns to the original writing state.

In general, at the inside surface of the front end part of the shaft barrel, a tapered surface is often formed, so the braking member 60 may also be configured to be able to be attached to a refill of an existing knock type writing instrument. The refill 4 and the braking member 60 may also be formed integrally and used as the braking part.

In this regard, if performing a knock operation at the knock type writing instrument in the writing state, the refill would strongly move to the rear due to the biasing force of the spring. That is, when switching from the writing state to the nonwriting state, impact is liable to be applied to the refill.

In the knock type writing instrument 1, at the time of such retraction of the refill 4, the projections 61 of the braking member 60 and the shaft barrel 2, specifically, the ring-shaped projection 15 of the front shaft 10, abut and the projections 61 of the braking member 60 move to the rear so as to slide and ride over the ring-shaped projection 15 of the shaft barrel 2. Due to the frictional resistance due to sliding of the projections 61 of the braking member 60 with respect to the ring-shaped projection 15 of the shaft barrel 2, the kinetic energy of the refill 4 and braking member 60 decreases and finally the impact applied to the refill 4 when the refill 4 retracts is eased. The spring characteristics and arrangement of the spring 6 are selected so as to bias the refill 4 against the above-mentioned frictional force and enable the knock type writing instrument 1 to be switched from the writing state to the nonwriting state.

Due to the above, at the knock type writing instrument 1, it is possible to ease the impact applied to the refill 4 both at the time of advance of the refill 4 and at the time of retraction of the refill 4. Note that, the projections 61 of the braking member 60 may also be omitted and just the impact applied to the refill 4 at the time of retraction of the refill 4 may be eased.

Figure 17:
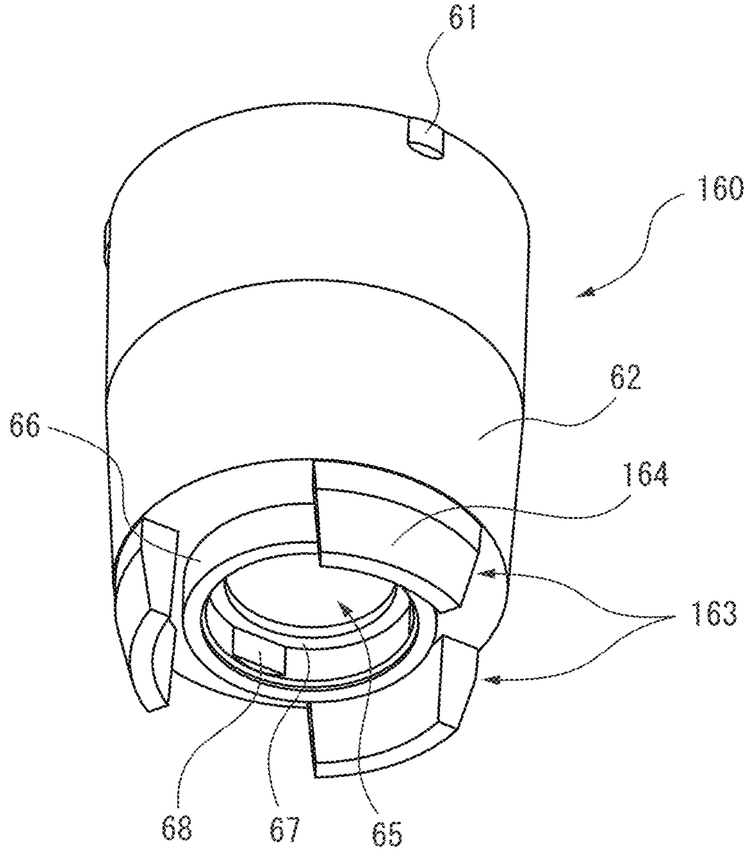
FIG. 17 is a perspective view of another braking member.

FIG. 17 is a perspective view of another braking member 160. The braking member 60 of the knock type writing instrument of FIG. 1 has four braking projections 63. The braking member 160 shown in FIG. 17 differs from the braking member 60 only on the point of having three braking projections 163. By reducing the number of the braking projections, the area of the braking tapered surfaces 164 is decreased compared with the braking tapered surfaces 64 of the braking projections 63. Therefore, the braking member 160 is decreased in frictional resistance due to sliding contact of the braking tapered surfaces 164 and the tapered surfaces 14 and in kinetic energy of the refill 4 and braking member 160 due to elastic deformation of the braking projections 163 compared with the above-mentioned braking member 60. Therefore, the braking member 160 is used if there is no need to reduce the kinetic energy compared with the case of use of the braking member 60, for example, if the refill 4 is lighter, if the spring constant of the spring 6 is smaller, etc.

Figure 18:
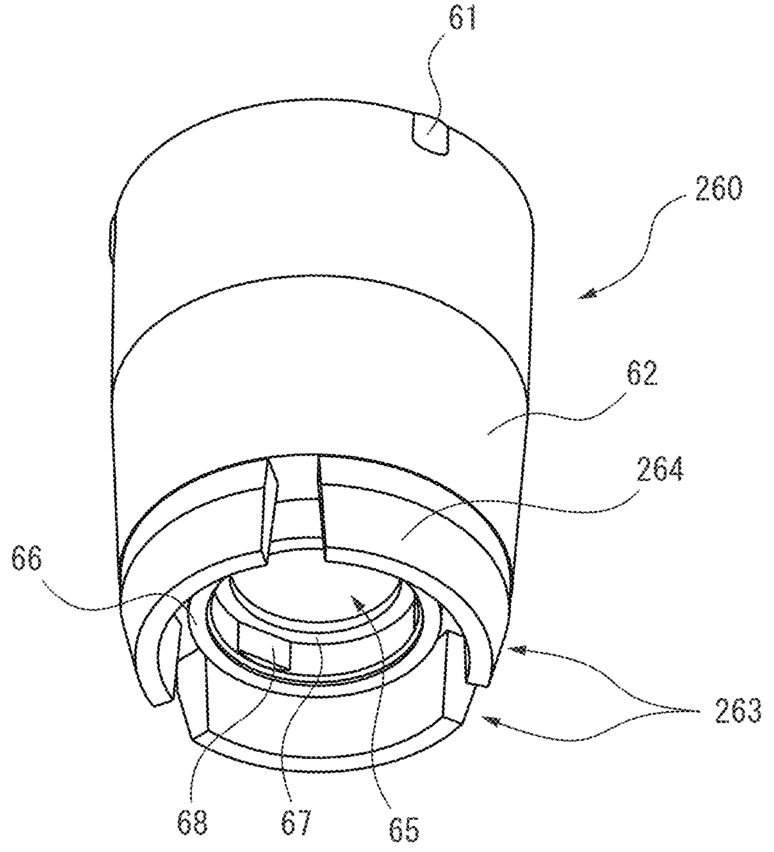
FIG. 18 is a perspective view of still another braking member.

FIG. 18 is a perspective view of still another braking member 260. The braking member 260 shown in FIG. 18 has three braking projections 263. It differs from the braking member 160 shown in FIG. 17 only on the point that the braking projections 263 are broader in width, that is, are longer in circumferential direction length. By making the braking projections broader in width, the areas of the braking tapered surfaces 264 increase compared with the braking tapered surfaces 64 of the braking projections 63. Further, the braking projections 263 become higher in rigidity against elastic deformation to the inside in the radial direction compared with the braking projections 63. Therefore, the braking member 260 is greatly decreased in frictional resistance due to sliding contact of the braking tapered surfaces 264 and the tapered surface 14 and in kinetic energy of the refill 4 and braking member 260 due to elastic deformation of the braking projections 263 compared with the above-mentioned braking member 60. Therefore, the braking member 260 is used if there is a need to reduce the kinetic energy over the case of use of the braking member 60, for example, if the refill 4 is heavier, if the spring constant of the spring 6 is larger, etc.

By adjusting the number, widths, shapes, etc. of the braking projections and the angles, lengths in axial direction, etc. of the braking tapered surfaces and the facing tapered surface of the front shaft 10, it is possible to adjust the frictional resistance and elastic deformation to the desired levels corresponding to the weights of the refill 4 and braking member, the spring constant of the spring 6, etc., and make the performance in easing impact the desired level. For example, there may be two or more braking projections of the braking member. The two or more braking projections are preferably arranged at equal intervals along the circumferential direction. There may also be a single projection of the braking member. Specifically, the member may also be an integral ring-shaped projection. In short, the braking member or braking part may be configured in any way so long as the outside surface of the refill, that is, the writing body, cooperates with the tapered surface of the shaft barrel to brake the writing body at the time of advance of the writing body.

Figure 19:
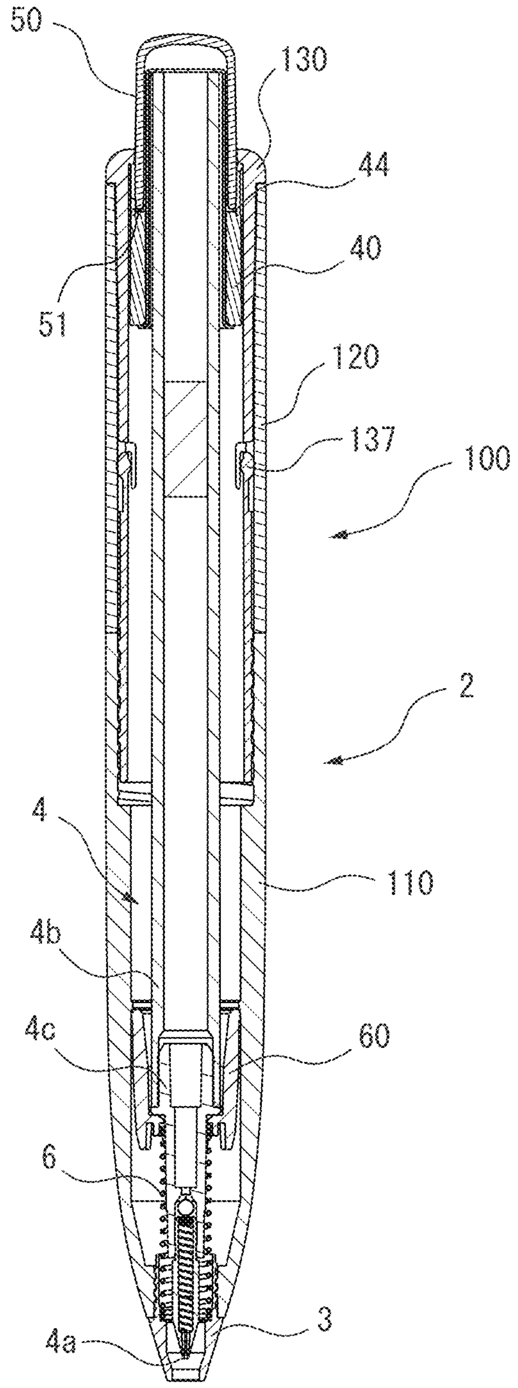
FIG. 19 is a vertical cross-sectional view of a second knock type writing instrument in the nonwriting state.

FIG. 19 is a vertical cross-sectional view of the second knock type writing instrument 100 in the nonwriting state.

The second knock type writing instrument 100 differs compared with the first knock type writing instrument 1 only in the shapes of the front shaft 110, rear shaft 120, and inside barrel 130. The rest of the members are the same as the members of the first knock type writing instrument 1. The front shaft 110 differs compared with the front shaft 10 of the first knock type writing instrument 1 only on the point of having a female screw part formed at the inside surface of the rear end part instead of a male screw part.

Figure 20:
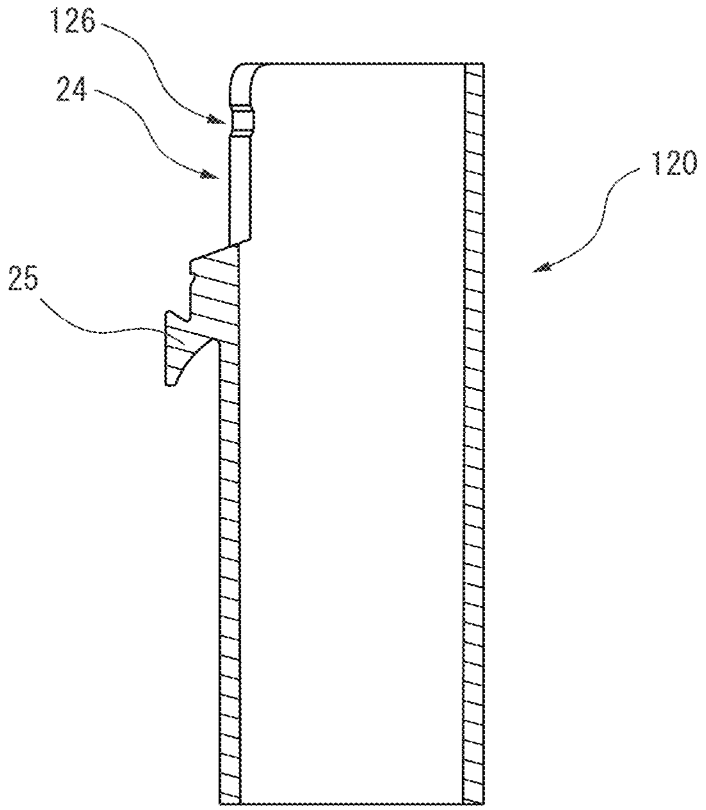
FIG. 20 is a vertical cross-sectional view of a rear shaft of the knock type writing instrument of FIG. 19.

FIG. 20 is a vertical cross-sectional view of the rear shaft 120 of the knock type writing instrument 100 of FIG. 19. The rear shaft 120 differs compared with the rear shaft 20 of the first knock type writing instrument 1 on the point of not having a female part and narrowing parts. Further, at the two inside surfaces extending in the axial direction of the cut part 24 and facing each other, two fitting recessed parts 126 are formed at corresponding positions. Furthermore, the total length of the rear shaft 120 is formed shorter compared with the rear shaft 20 of the first knock type writing instrument 1.

Figure 21:
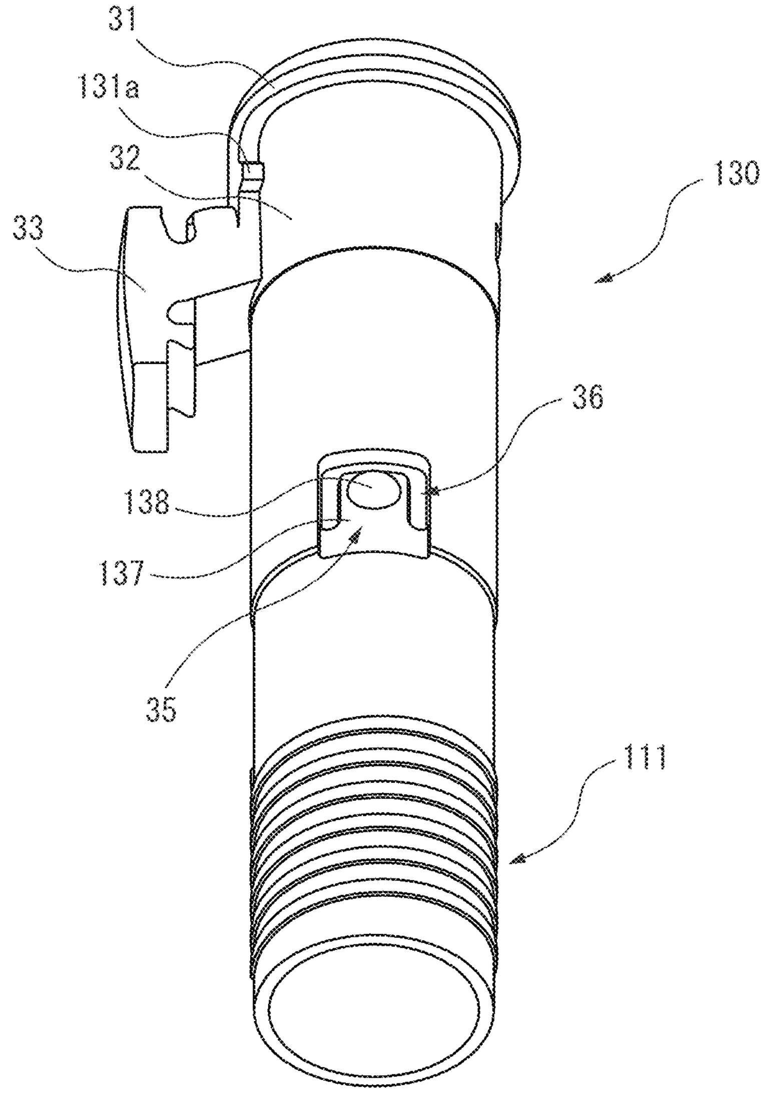
FIG. 21 is a vertical cross-sectional view of an inside barrel of the knock type writing instrument of FIG. 19.
Figure 22:
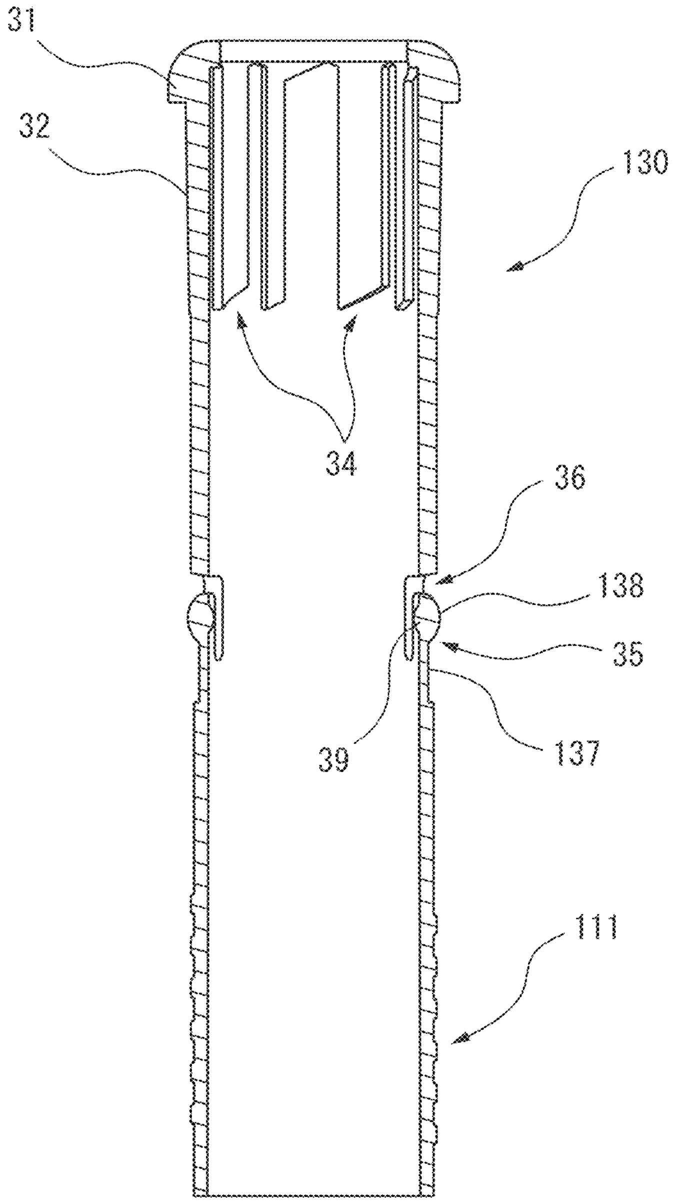
FIG. 22 is a vertical cross-sectional view of an inside barrel of FIG. 21.

FIG. 21 is a perspective view of the inside barrel 130 of the knock type writing instrument 100 of FIG. 19, while FIG. 22 is a vertical cross-sectional view of the inside barrel 130 of FIG. 21. The inside barrel 130, compared with the inside barrel 30 of the first knock type writing instrument 1, is formed with two fitting projecting parts 131*a* extending in opposite directions to each other in the circumferential direction at the part connecting the flange part 31 and second clip holding part 33. Further, the first projecting part 138 sticks out to the outside in the radial direction more than the first projecting part 38 of the first knock type writing instrument 1. Specifically, the circumscribed circle of the two first projecting parts 138 is formed just slightly larger than the inner diameter of the rear shaft 120. Furthermore, the part in front from the elastically deformable part 137 is formed longer than the inside barrel 30 of the first knock type writing instrument 1. A male screw part 111 is formed at its outside surface.

The second knock type writing instrument 100 is basically assembled in the same way as the first knock type writing instrument 1 is assembled. That is, the rotor 40 and the operating member 50 are pressed and inserted inside the inside barrel 130 from the front end opening. If the rotor 40 and the operating member 50 are inserted beyond the elastically deformable part 137, the rotor 40 and the operating member 50 will not drop off by their own weights due to the rotor 40 being locked with the second projecting part 39.

The inside barrel 130 in the state where the rotor 40 and the operating member 50 are assembled is pressed and inserted inside the rear shaft 120 from the rear end opening. Due to this, the second clip holding part 33 is fit with the first clip holding part 25, the fitting surface 32 is fit with the inside surface of the rear end part of the rear shaft 20, and, furthermore, the corresponding fitting projecting parts 131*a* of the inside barrel 130 are fit with the two fitting recessed parts 126 of the rear shaft 120. As a result, the rear shaft 120 and the inside barrel 130 are fit together.

In the state where the inside barrel 130 is attached to the rear shaft 120, the first projecting part 138 of the elastically deformable part 137 abuts against the inside surface of the rear shaft 120, and the elastically deformable part 137 is made to elastically deform so as to curve to the inside in the radial direction. Due to this, in the same way as the first knock type writing instrument 1, the rear end edge of the inside surface of the elastically deformable part 137 sticks out to the inside in the radial direction more than the cylindrical outside surface of the cam member 41 of the rotor 40. As a result, movement of the rotor 40 and the operating member 50 is stopped by the front end edge or front end face of the rotor 40 locking with the rear end edge or rear end face of the elastically deformable part 137. Therefore, at the time of replacement of the refill etc., even if the front end opening of the rear shaft 120 is made to face vertically downward, the rotor 40 will not unintentionally drop off from the rear shaft 120 and inside barrel 130.

Next, to hold the refill 4 and spring 6 inside, the inside barrel 130 to which the rear shaft 120 is attached is screwed with the front shaft 110, whereby the knock type writing instrument 100 finishes being assembled. That is, in the first knock type writing instrument 1, the rear shaft 20 is made to be screwed with the front shaft 10, while in the second knock type writing instrument 100, the inside barrel 130 is made to be screwed with the front shaft 110. Due to this, the rear shaft 120 or the inside barrel 130 is prevented from ending up being detached from the front shaft 110.

Specifically, in the first knock type writing instrument 1, the inside barrel 30 is connected to the rear shaft 20 by engagement by friction between the inside surface of the rear end part of the rear shaft 20 and the fitting surface 32 of the inside barrel 30. For this reason, in the case of a user with a particularly strong writing force, force is transmitted through the refill 4 and the rotor 40 to the outside cam 34 of the inside barrel 30 and the inside barrel 30 is liable to detach from the rear shaft 20. On the other hand, in the second knock type writing instrument 100, similarly, the inside barrel 130 formed with the outside cam 34 is connected with the front shaft 110 by screwing them together, so even in the case of a user with a particularly strong writing pressure, the inside barrel 130 will never detach from the front shaft 110. In short, according to the second knock type writing instrument 100, it is possible to prevent detachment of the inside barrel 130 at the time of writing. Note that, the rear shaft 120 is loosely fit with only the inside barrel 130, so the rear shaft 120 will also never detach.

The inside barrel 130 fit with the front shaft 110 may also be called the "rear shaft". In this case, the rear shaft 120 is a tubular member making the elastically deformable parts 137 elastically deform to the inside in the radial direction and is also a spacer for gripping an object between its outside surface and the clip member 5.

Figure 23:
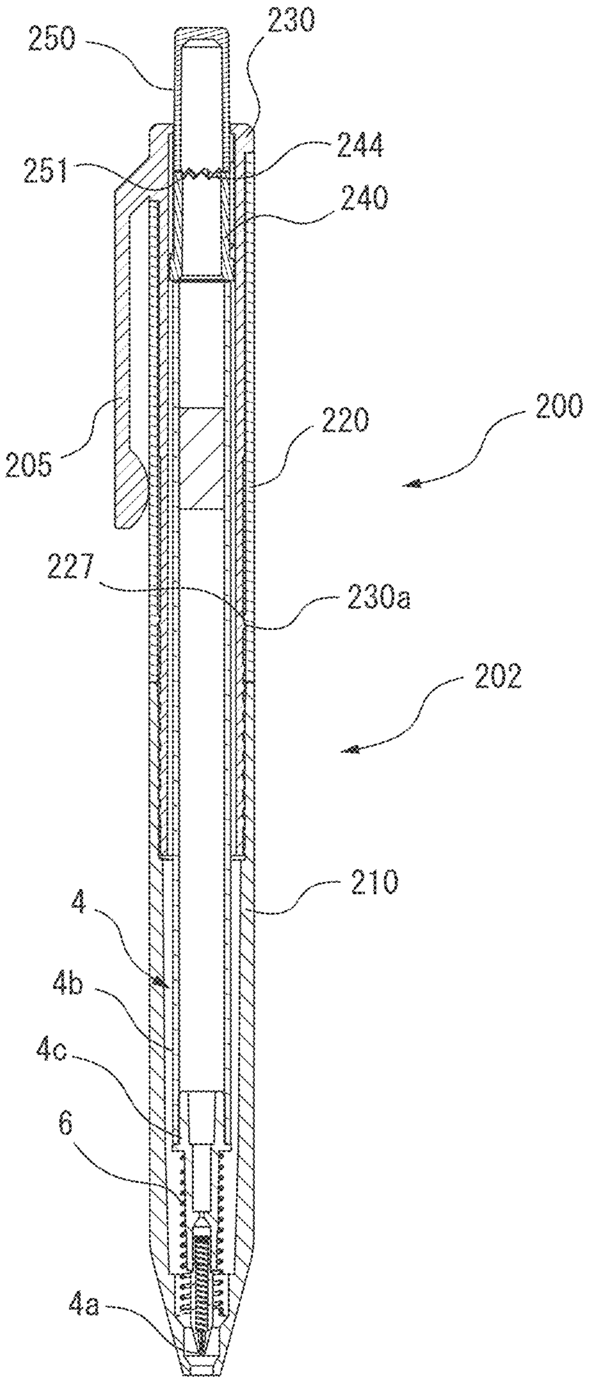
FIG. 23 is a vertical cross-sectional view of a third knock type writing instrument in the nonwriting state.

FIG. 23 is a vertical cross-sectional view of the third knock type writing instrument 200 in the nonwriting state. The members of the third knock type writing instrument 200 are different from the members of the first knock type writing instrument 1 and second knock type writing instrument 100. However, the third knock type writing instrument 200 is common with the second knock type writing instrument 100 on the point of having a mechanism for preventing the inside barrel 230 from detaching at the time of writing by having the front shaft 210 and the inside barrel 230 connected by screwing them together. However, the mode of connection of the rear shaft 220 and inside barrel 230 of the third knock type writing instrument 200 differs from the mode of connection of the rear shaft 120 and inside barrel 130 of the second knock type writing instrument 100.

The knock type writing instrument 200 has a shaft barrel 202 provided with a front shaft 210, rear shaft 220, and inside barrel 230 and has a refill 4 biased rearward by the spring 6 and does not have a braking member. At the side surface of the shaft barrel 202, there is a clip part 205 formed integrally with the rear shaft 220. At the rear end face of the refill 4, the front end face of the rotor 240 abuts. To the rear of the rotor 240, an operating member 250 is arranged. The operating member 250 has a cam face 251. The rotor 240 has a cam receiving face 244 configured so as to cooperate with the cam face 251 of the operating member 250. At the inside surface of the rear shaft 220, a ring-shaped first projection 227 is formed along the circumferential direction.

Figure 24:
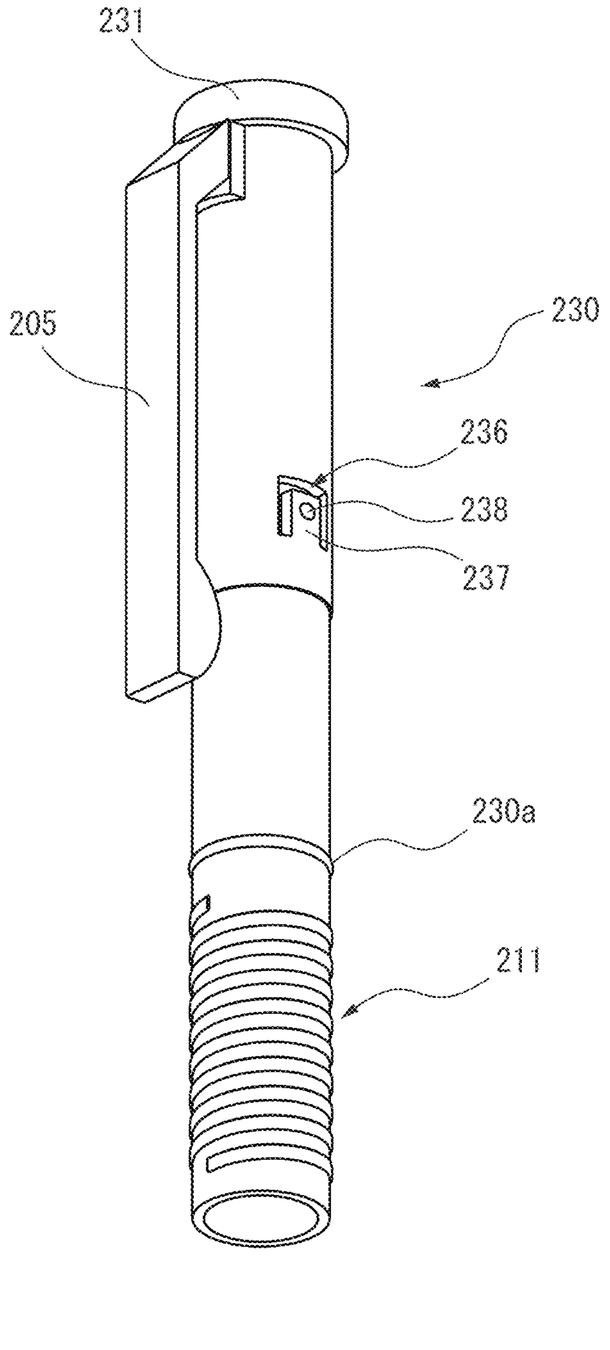
FIG. 24 is a perspective view of an inside barrel of the knock type writing instrument of FIG. 23.
Figure 25:
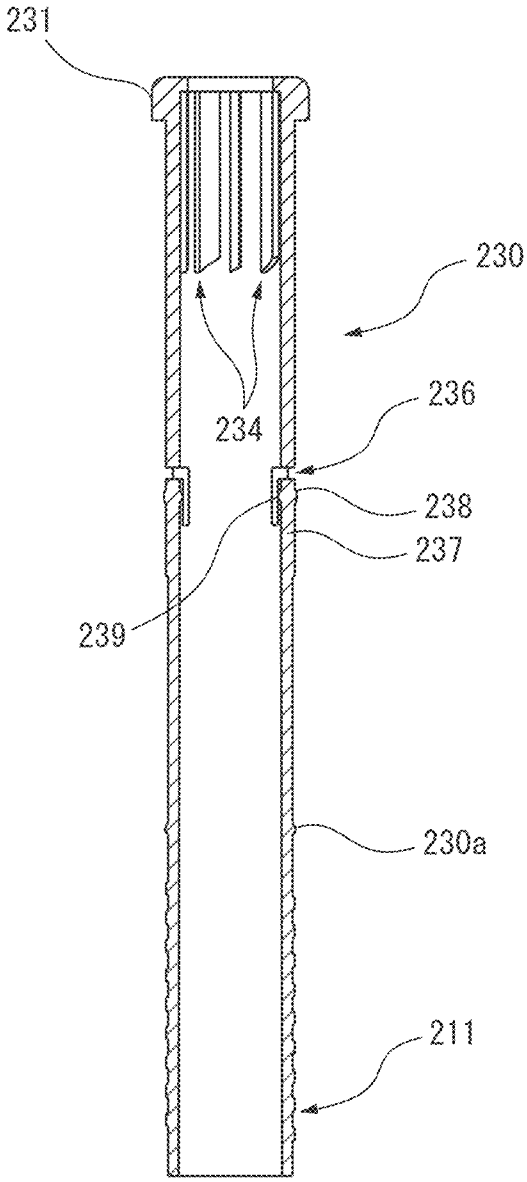
FIG. 25 is a vertical cross-sectional view of the inside barrel of FIG. 24.

FIG. 24 is a perspective view of the inside barrel 230 of the knock type writing instrument 200 of FIG. 23, while FIG. 25 is a vertical cross-sectional view of the inside barrel 230 of FIG. 24. At the outside surface of the rear end part of the inside barrel 230, a flange part 231 is formed. To the front of the flange part 31, the clip part 205 is formed. At the inside surface of the rear end part of the inside barrel 230, an outside cam 234 is formed comprised of a plurality of projecting parts extending in the front-back direction.

At the outside surface of the inside barrel 230, in the same way as the U-shaped holes 36 of the first knock type writing instrument 1, two substantially U-shaped holes 236 are formed. Due to the two U-shaped holes 236, two elastically deformable parts 237 are defined. Note that, the inside barrel 230 is not formed with the recessed parts 35 formed at the inside barrel 30 of the first knock type writing instrument 1. The elastically deformable parts 237 are cantilever shapes extending to the rear. At the outside surfaces of the elastically deformable parts 237, first projecting parts 238 are formed sticking out to the outside in the radial direction. At the inside surfaces of the elastically deformable parts 237, second projecting parts 239 are formed sticking out to the inside in the radial direction. The first projecting parts 238 and second projecting parts 239 are spherical surface projections.

The first projecting parts 238 stick out to the outside in the radial direction more than the first projecting parts 38 of the first knock type writing instrument 1. Specifically, the circumscribed circle of the two first projecting parts 238 is formed to become just slightly larger than the inner diameter of the rear shaft 220. The inscribed circle of the two second projecting parts 239 is formed to become just slightly smaller than the outer diameter of the front end part of the rotor 240. At the part at the front of the elastically deformable parts 237, a male screw part 211 is formed screwing together with the female screw part formed at the inside surface of the rear end part of the front shaft 210. To the rear of the male screw part 211, a ring-shaped second fitting projection 230*a* is formed corresponding to the first fitting projection 227.

The third knock type writing instrument 200 is basically assembled in the same way as the second knock type writing instrument 100. That is, the rotor 240 and the operating member 250 are pressed and inserted inside the inside barrel 230 from the front end opening. If the rotor 240 and the operating member 250 are inserted beyond the elastically deformable parts 237, the rotor 240 is engaged with the second projecting parts 239, whereby the rotor 240 and the operating member 250 will not drop off due to their own weight.

The inside barrel 230 with the rotor 240 and the operating member 250 assembled into it is pressed and inserted inside the rear shaft 220 from the rear end opening. Due to this, the second fitting projections 230*a* of the inside barrel 230 ride over the first fitting projection 227 of the rear shaft 220. As a result, the rear shaft 220 and the inside barrel 230 are fit together.

In the state where the inside barrel 230 is attached to the rear shaft 220, the first projecting parts 238 of the elastically deformable parts 237 abut against the inside surface of the rear shaft 220 whereby the elastically deformable parts 237 elastically deform so as to curve to the inside in the radial direction. Due to this, in the same way as the first knock type writing instrument 1, the rear end edges of the inside surfaces of the elastically deformable parts 237 stick out to the inside in the radial direction more than the outer diameter of the rotor 240. As a result, movement of the rotor 240 and the operating member 250 is stopped by the front end edge or the front end face of the rotor 240 locking with the rear end edges or rear end faces of the elastically deformable parts 237. Therefore, at the time of replacement of the refill etc., even if the front end opening of the rear shaft 220 is made to face vertically downward, the rotor 240 will never unintentionally drop off from the rear shaft 220 and inside barrel 230.

Next, to hold the refill 4 and spring 6 inside, the inside barrel 230 to which the rear shaft 220 is attached is screwed with the front shaft 210 whereby the knock type writing instrument 200 finishes being assembled. That is, in the first knock type writing instrument 1, the rear shaft 20 is screwed with the front shaft 10, but in the third knock type writing instrument 200, like the second knock type writing instrument 100, the inside barrel 230 is screwed with the front shaft 210. Due to this, the rear shaft 220 or inside barrel 230 is prevented from ending up detaching from the front shaft 210.

Therefore, in the third knock type writing instrument 200, in the same way as the second knock type writing instrument 100, the inside barrel 230 is connected with the front shaft 210 by screwing them together, therefore the inside barrel 230 will not separate from the front shaft 210 even with a user with a particularly strong writing pressure. In short, according to the third knock type writing instrument 200, it is possible to prevent detachment of the inside barrel 230 at the time of writing. Note that, the rear shaft 220 is loosely fit with only the inside barrel 230, so the rear shaft 220 will also never detach.

The inside barrel 230 fit with the front shaft 210 may also be called the "rear shaft". In this case, the rear shaft 220 is a tubular member with elastically deformable parts 237 made to elastically deform to the inside in the radial direction and is also a spacer for gripping an object between its outside surface and a clip part 205.

According to the second knock type writing instrument 100 and third knock type writing instrument 200, since they have the front shaft, rear shaft, and inside barrel provided with the outside cam, and the front shaft and inside barrel are connected by screwing them together, the inside barrel will never detach at the time of writing. On the other hand, the rear shaft is loosely fit with the inside barrel, so the knock type writing instrument 100 and knock type writing instrument 200 can be easily disassembled. The rear shaft and inside barrel may be fit together in any way so long as they are easily released by the hand. The front shaft and inside barrel may be connected by press fitting or any other method instead of screwing so long as they will not separate even with a user with a particularly strong writing pressure.

The refill 4 may be for a marking pen, touch pen, eraser, or other type of writing body besides a ball point pen. Further, part or all of the operating member 50 may be made an erasing part for erasing writing by the knock type writing instrument. The refill 4 may contain thermochromic ink containing a thermochromic coloring matter. In this case, the knock type writing instrument is a knock type thermochromic writing instrument. The heat of friction generated when rubbing by a friction body used as an erasure member can be used to change the color of writing by the knock type writing instrument.

Here, "thermochromic ink" means an ink having the property of maintaining a predetermined color (first color) at ordinary temperature (for example 25° C.), changing to a separate color (second color) if making the temperature rise to a predetermined temperature (for example, 60° C.), then again returning to the original color (first color) if then cooling down to a predetermined temperature (for example, −5° C.). In a knock type writing instrument using thermochromic ink, making the second color a colorless once and raising the temperature of a line written by the first color (for example red) to render it colorless will be referred to here as "erasure". Therefore, a written surface etc. on which a line is drawn may be rubbed by a friction body to cause generation of heat of friction and thereby make the line change to become colorless, that is, be erased. Note that, only naturally, the second color may also be a color other than a colorless one.

REFERENCE SIGNS LIST

1 knock type writing instrument
2 shaft barrel
3 tip member
4 refill
6 spring
10 front shaft
14 tapered surface
20 rear shaft
22 narrowing part
30 inside barrel
34 outside cam
35 recessed part
36 U-shaped hole
37 elastically deformable part
38 first projecting part
39 second projecting part
40 rotor
41 cam member
42 received member
43 inside cam
50 operating member
60 braking member
61 projection
63 braking projection
64 braking tapered surface

The invention claimed is:

1. A writing instrument comprising a cylindrical first tubular member, a cylindrical second tubular member inserted inside the first tubular member from one end part of the first tubular member, the second tubular member provided at its side surface with an elastically deformable part able to elastically deform to an outside and to an inside in a radial direction, and a cylindrical or columnar inside member inserted inside the second tubular member from one end part of the second tubular member, an outside surface of the elastically deformable part or an inside surface of the first tubular member having a first fitting part, an inside surface of the elastically deformable part having a second fitting part, the first fitting part configured to make the elastically deformable part deform to the inside in the radial direction if the second tubular member is inserted into the first tubular member, the second fitting part configured to make the elastically deformable part deform to the outside in the radial direction if the inside member is inserted inside the second tubular member in a state before the second tubular member is inserted inside the first tubular member, the deformed elastically deformable part returning after insertion of the inside member.

2. The writing instrument according to claim 1, wherein the first tubular member is a shaft barrel, the second tubular member is an inside barrel inserted from a rear end part of the shaft barrel, and the inside member is a rotor or operating member inserted from a front end part of the inside barrel.

3. The writing instrument according to claim 2, wherein the first fitting part or the second fitting part is a projection.

4. The writing instrument according to claim 1, further comprising a front shaft, the first tubular member being a rear shaft, the second tubular member being an inside barrel inserted from a rear end part of the rear shaft, the front shaft and the inside barrel being screwed together, and the inside member being a rotor or operating member inserted from a front end part of the inside barrel.

5. The writing instrument according to claim 4, wherein the first fitting part or the second fitting part is a projection.

6. The writing instrument according to claim 1, wherein the elastically deformable part is a cantilever shape extending to a rear of the writing instrument.

7. The writing instrument according to claim 1, wherein the first fitting part or the second fitting part is a projection.

* * * * *